(12) United States Patent
Yoshida et al.

(10) Patent No.: US 7,857,278 B2
(45) Date of Patent: Dec. 28, 2010

(54) VEHICULAR MIRROR DEVICE

(75) Inventors: Shigeki Yoshida, Aichi-ken (JP); Yoshio Tsujiuchi, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 559 days.

(21) Appl. No.: 11/961,637

(22) Filed: Dec. 20, 2007

(65) Prior Publication Data

US 2008/0149803 A1 Jun. 26, 2008

(30) Foreign Application Priority Data

Dec. 25, 2006 (JP) ............... 2006-347855

(51) Int. Cl.
  *A47G 1/24* (2006.01)
  *B60R 1/02* (2006.01)
(52) U.S. Cl. .................... 248/479; 296/1.11
(58) Field of Classification Search ........... 248/479; 296/1.11
  See application file for complete search history.

(56) References Cited

U.S. PATENT DOCUMENTS 5,636,071 A * 6/1997 Mochizuki et al. ......... 359/877
6,979,091 B2 * 12/2005 Ichikawa ................ 359/872
2002/0135905 A1 * 9/2002 Yoshida ................. 359/841

FOREIGN PATENT DOCUMENTS

JP 2548021 Y2 5/1997

* cited by examiner

*Primary Examiner*—J. Allen Shriver, II
*Assistant Examiner*—Christopher Garft
(74) *Attorney, Agent, or Firm*—Roberts Mlotkowski Safran & Cole, P.C.; Thomas W. Cole

(57) ABSTRACT

The operation torque during disengaging of clutch projections out of clutch grooves, is effectively suppressed from excessively increasing immediately after start of device assembling. In a door mirror device, a gear plate has clutch grooves made substantially in trapezoidal form, in circumferential cross-section, increasing in width from a groove bottom to an opening end. A clutch disk has clutch projections made substantially in trapezoidal form, in circumferential cross-section, decreasing in width in taper form from a base toward a tip wherein the top surfaces are made in an inverted radial form decreasing in width from inner periphery to outer periphery. Due to this, when a torque exceeding a set value is transmitted to the gear plate, the pressure-contact area of the clutch projection with the clutch groove gradually moves from inner periphery to outer periphery while moving the clutch disk upward against a bias force of a clutch spring.

9 Claims, 19 Drawing Sheets

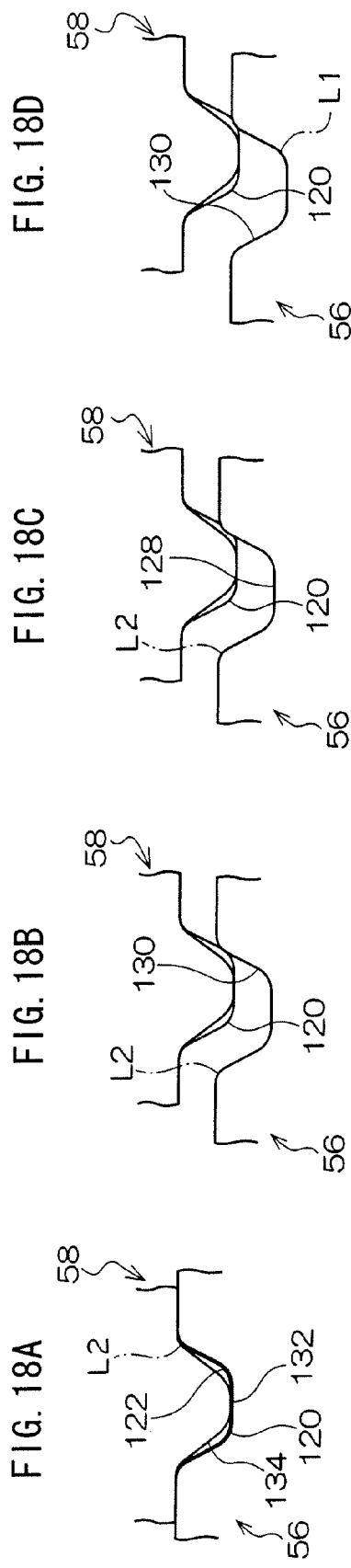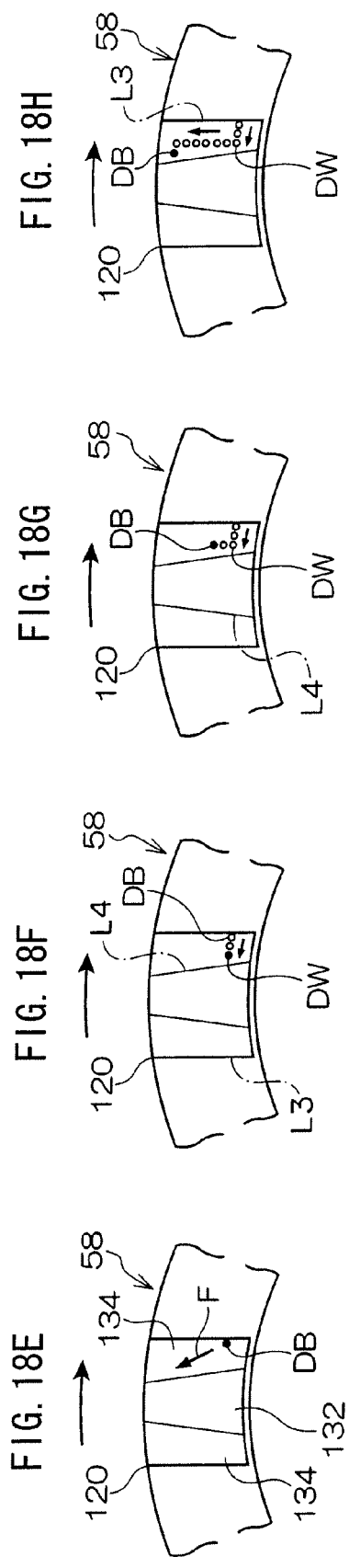

VEHICULAR MIRROR DEVICE

CROSS-REFERENCE TO RELATED APPLICATION

This application claims priority under 35 USC 119 from Japanese Patent Application No. 2006-347855, the disclosure of which is incorporated by reference herein.

BACKGROUND

1. Field of the Invention

The present invention relates to a vehicular mirror device for use as an automotive door mirror device or the like and to couple a rearview mirror to a vehicle body and rotatably support it on the vehicle body.

2. Related Art

There is known, for example, a description in Japanese Utility Model Registration No. 2,548,021 as a power-operated vehicular door mirror device. The vehicular mirror device described in Japanese Utility Model Registration No. 2,548,021 (hereinafter, referred merely to as a "door mirror device") has a mirror base on which a cylindrical support shaft is provided upright, a mirror housing rotatably supported on the support shaft, a torque transmission mechanism that conveys the torque generated at a drive the motor arranged on a mirror base to the mirror housing, and a clutch assembly provided in a torque transmission system of the torque transmission mechanism. The clutch assembly has a driving clutch disk in a ring form formed with projection strips (clutch projections), a driven clutch disk in a ring form formed with grooves (clutch grooves) for removably receiving the clutch projections, and a clutch spring for biasing the driving clutch disk toward the driven clutch disk.

In the mirror device described in Japanese Utility Model Registration No. 2,548,021, when an excessive torque is conveyed from the mirror housing to the driving clutch disk, the clutch projections of the driving clutch disk move out of the clutch grooves of the driven clutch disk. By releasing the coupling between the driving clutch disk and the driven clutch disk, the torque transmission mechanism is protected against excessive torque.

In the door mirror device as described in Japanese Utility Model Registration No. 2,548,021, cross sections along the radial direction of the clutch groove and the clutch projection are each formed in a trapezoidal form having slant surfaces at circumferential direction both ends thereof, so that, during torque transmission, the clutch projection at its one slant surface can be placed in pressure contact with one slant surface of the clutch groove. On this occasion, when excessive torque is transmitted to the driving clutch disk, the component force along the axis direction caused upon the slant surfaces of the clutch projection and clutch groove becomes greater than the bias force of the clutch spring, the clutch projection moves out of the clutch groove thereby releasing the coupling between the clutch disks.

However, by edge lines of the clutch projection between the top surface thereof and a pair of slant surfaces thereof, and edge lines between the slant surfaces and one end surface of the driving clutch disk being respectively provided so as to be directed parallel with the radial direction about the axis, as well as edge lines of the clutch groove between the bottom surface thereof and a pair of slant surfaces thereof, and edge lines between the slant surfaces and the other end surface of the driven clutch disk being respectively provided so as to be directed parallel with the radial direction, only a portion of the slant surface of the clutch projection at the outer peripheral side is locally pressure-contacted with only a portion of the slant surface of the clutch groove at the outer peripheral side during rotation of the driving clutch disk as described in Japanese Utility Model Registration No. 2,548,021.

During rotation of the driving clutch disk as above, if only a portion of the slant surface of the clutch projection at the outer peripheral side is locally pressure-contacted with only a portion of the slant surface of the clutch groove at the outer peripheral side during rotation of the driving clutch disk, there possibly encounters a phenomenon that the clutch projection and the clutch groove are firmly fixed together (metal-to-metal sticking) when operating the clutch assembly, i.e. when releasing the coupling state between the clutch disks, immediately after completing the assembling of the door mirror device. Even when an excessive torque much greater than a previously set threshold is transmitted to the driving clutch disk, there is a possibility that the coupling cannot be released between the clutch disks. This possibly applies an excessive load to the torque transmission mechanism and mirror housing and causes damages to those.

The sticking phenomenon like the above is to disappear rapidly as the number of operation cycles of the clutch assembly increases. When the clutch assembly is operated some three to four times for example, the clutch assembly is allowed to be stably operated with accuracy in values near the previously set threshold value.

SUMMARY OF THE INVENTION

The present invention provides a vehicular mirror device whose operation torque on a driving clutch disk during disengaging clutch projections out of clutch grooves, is effectively suppressed from excessively increasing relative to a set value immediately after a start of device assembling.

In accordance with a first aspect of the invention, there is provided a vehicular mirror device including: a mirror stand on which a support shaft is provided and which is coupled to a vehicle body; a rotary case that is disposed on an outer periphery of the support shaft such that the rotary case is supported rotatably by the support shaft, and that is coupled with a rearview mirror; a driven clutch disk of annular shape, that is fitted by insertion to the outer periphery of the support shaft such that the driven clutch disk is fixed to the support shaft along a rotation direction whose center is the support shaft, and is supported movably in an axial direction of the support shaft; a driving clutch disk of annular shape, that is fitted by insertion to the outer periphery of the support shaft such that the driving clutch disk is supported relatively rotatably by the support shaft, and is coupled to the rotary case along the rotation direction; a clutch biasing member that biases in the axial direction the driven clutch disk toward the driving clutch disk; a clutch groove that is formed on one of one end surface of the driven clutch disk or another end surface of the driving clutch disk, the clutch groove being formed so as to extend along a radial direction whose center is an axis center of the support shaft; and a clutch projection that is formed on the other of the one end surface of the driven clutch disk or the another end surface of the driving clutch disk, the clutch projection being formed so as to extend along the radial direction, in which when torque is transmitted from the rotary case to the driving clutch disk in a value which is equal to or smaller than a set value corresponding to a bias force of the biasing member, the clutch projection is received in the clutch groove to be in a coupling state in which the driving clutch disk is coupled to the driven clutch disk so as to allow transmission of torque, and when torque is transmitted from the rotary case to the driving clutch disk in a value which exceeds the set value, the clutch projection is moved out from the clutch groove to release the coupling state; wherein the clutch groove is formed substantially in a trapezoidal shape in a cross section along a circumferential direction whose center is the axis center of the support shaft, in which a width of the clutch groove increases from a groove bottom surface toward a groove opening end, and the clutch projection is formed substantially in a trapezoidal shape in the cross section along the circumferential direction, in which a width of the clutch projection decreases from a projection base end toward a projection tip end, and a top surface of the clutch projection is formed in an inverted radial shape in which a width of the top surface decreases from an inner periphery side toward an outer periphery side.

According to the first aspect of the vehicular mirror device, the clutch groove is made substantially in a trapezoidal form, in circumferential cross section, increasing in width from the groove bottom to the groove opening end, and moreover, the clutch projection is made substantially in a trapezoidal form, in circumferential cross section, decreasing in width from the projection base toward the projection tip wherein the top surface of the clutch projection is made in an inverted radial form decreasing in width from the inner periphery side to the outer periphery side. Due to this, when a torque equal to or smaller than the set value is transmitted from the rotary case to the driving clutch disk, the clutch projection is kept received in the clutch groove. While one side surface of the clutch projection is pressure-contacted with one side surface of the clutch groove, the contact pressure force (load) acting from the clutch-projection side surface to the clutch-groove side surface is transmitted as a torque about the support shaft to the driven the clutch disk. By the reaction force of the torque, the rotary case rotates following the driving clutch disk. At this time, a portion of the side surface of the clutch projection whose portion is at the inner periphery side is placed in pressure contact with a portion of the side surface of the clutch groove whose portion is at the inner periphery side.

In the first aspect of the vehicular mirror device, when a torque exceeding the set value is transmitted from the rotary case to the driving clutch disk, the component force along the axial direction which is caused between the side surface of the clutch projection which is slanted relative to the axial direction and the side surface of the clutch groove which is slanted relative to the axial direction, is greater than the bias force of the clutch biasing member. While the driven clutch disk gradually moves upward against the bias force of the clutch biasing member in a direction such that that it is apart from the driving clutch disk, the clutch projection gradually disengages from the clutch groove. When the driving clutch disk rotates a predetermined amount, the clutch projection moves out of the clutch groove.

In this case, because the top surface of the clutch projection is made in an inverted radial form decreasing in width from the inner periphery to the outer periphery, the clutch projection can be relatively moved (slid) along the axis direction in a direction moving out of the clutch groove, while gradually moving, from the inner periphery side to the outer periphery side, the pressure-contact area where one side surface of the clutch projection pressure-contacts with one side surface of the clutch groove according to the rotation amounts of the driving clutch disk increasing.

Therefore, according to the first aspect of the vehicular mirror device, when a torque exceeding the set value is transmitted to the driving clutch disk, the clutch projection moves out of the clutch groove due to the rotation (phase change) of the driving clutch disk, wherein the pressure-contact area between the clutch projection and the clutch groove moves from the inner periphery side to the outer periphery side. Therefore, as compared to the conventional structure in which edge lines of a clutch projection and edge lines of a clutch groove are provided parallel with a radial direction and a pressure-contact area between a clutch-projection side surface and a clutch groove side surface is almost no changing, the occurrence of sticking phenomenon can be effectively prevented at which phenomenon firm fixing takes places between the side surface of the clutch projection and the side surface of the clutch groove immediately after a start of device assembling. As a result, it is possible to suppress from excessively increasing due to the occurrence of sticking phenomenon, with respect to the set value, the operation torque for the driving clutch disk to disengage the clutch projection out of the clutch groove.

According to a second aspect of the vehicular mirror device, the vehicular mirror device further includes a torque generation source that is disposed in the rotary case, and a torque transmission mechanism that is disposed in the rotary case, the torque transmission mechanism coupling the torque generation source to the driving clutch disk so as to allow transmission of torque such that a torque generated by the torque generation source is transmitted to the driving clutch disk as a driving torque in the rotation direction whose center is the support shaft.

In the second aspect of the vehicular mirror device, the torque transmission mechanism arranged in the rotary case is to transmit, as rotational driving torque, the torque generated by the torque generation source to the driving clutch disk. By generating a torque by the torque generation source, the rotary case can be rotated about the support shaft.

According to a third aspect of the vehicular mirror device, a first edge line at which the groove bottom surface and a groove side surface intersect in the clutch groove, and a second edge line at which the side surface intersects with the one of the one end surface of the driven clutch disk or the another end surface of the driving clutch disk are provided extending parallel with the radial direction respectively, and a third edge line, at which a side surface of the clutch projection intersects with the other of the one end surface of the driven clutch disk or the another end surface of the driving clutch disk, is provided extending parallel with the radial direction.

In the third aspect of the vehicular mirror device, the top surface of the clutch projection is made in an inverted radial form decreasing in width from the inner periphery side to the outer periphery side and, moreover, the third edge line at which the side surfaces of the clutch projection intersect with the other of the one end surface of the driven clutch disk or the another end surface of the driving clutch disk, is provided extending parallel with the radial direction. When a torque exceeding the set value is transmitted from the rotary case to the driving clutch disk, the direction of the component force generated at the side surface of the clutch projection and the side surface of the clutch groove can be approximated to the moving direction of the pressure-contact area. The pressure contact area between the side surface of the clutch projection and the side surface of the clutch groove can be gradually moved (slid) smoothly from the inner periphery side to the outer periphery side as the driving clutch disk increases in rotation amount.

According to a fourth aspect of the vehicular mirror device, a plurality of clutch grooves are formed on the one of the one end surface of the driven clutch disk or the another end surface of the driving clutch disk along a circumference direction whose center is the axis center of the support shaft, and a plurality of clutch projections are formed on the other of the one end surface of the driven clutch disk or the another end surface of the driving clutch disk along the circumference direction.

According to a fifth aspect of the vehicular mirror device, the clutch groove is formed on the another end surface of the driving clutch disk, and the clutch projection is formed on the one end surface of the driven clutch disk.

According to a sixth aspect of the vehicular mirror device, the clutch projection is formed on the another end surface of the driving clutch disk, and the clutch groove is formed on the one end surface of the driven clutch disk.

According to a seventh aspect of the vehicular mirror device, a pair of fourth edge lines at which the top surface of the clutch projection and the side surfaces positioned at both sides of the top surface intersect are inclined with respect to a line extending from the axis center in the radial direction such that an outer peripheral side of the fourth edge line is nearer than an inner peripheral side of the fourth edge line to the line extending from the axis center in the radial direction.

As explained so far, the vehicular mirror device according to the invention can effectively suppress, from excessively increasing, with respect to a set value, the operation torque for a driving clutch disk when disengaging of the clutch projection out of the clutch groove, immediately after a start of device assembling.

BRIEF DESCRIPTION OF THE DRAWINGS

Embodiments of the invention will be described in detail with reference to the following figures, wherein:

FIGS. 18A-18H are side views and plan views showing the operation of disengaging the clutch projection of the clutch disk shown in FIG. 9 out of the clutch groove of the gear plate.

DETAILED DESCRIPTION OF THE INVENTION

With reference to the drawings, description will be now made on a vehicular mirror device according to an exemplary embodiment of the present invention.

Construction of the Exemplary Embodiment

Figure 1:
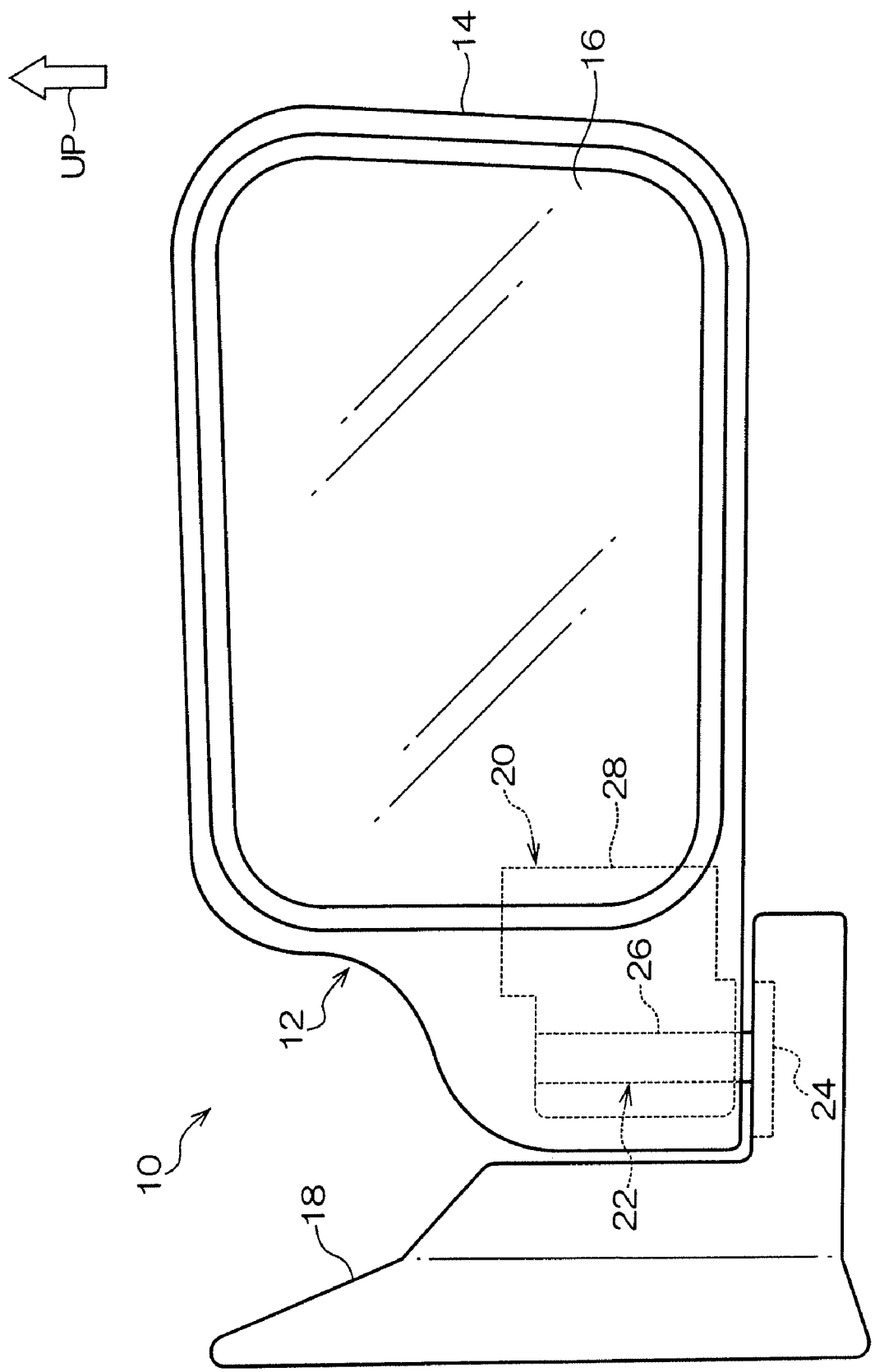
FIG. 1 is a front view showing a schematic construction of a door mirror device according to an embodiment of the present invention.

FIG. 1 shows a front view of a schematic construction of a door mirror device 10 as a vehicular mirror device according to an exemplary embodiment of the invention. Note that, in the drawings, the arrow UP is indicative of the upper with respect to the vehicle body while the arrow FR is the frontward with respect to the vehicle body. In the ensuing description, the "upper" and the "lower" are indicative of respective directions in the state that a door mirror device 10 is mounted on the vehicle.

The door mirror device 10 includes a door mirror body 12. The door mirror body 12 has a visor 14. A vehicular rearview mirror 16 is held at the inside of the visor 14 through a frame and a mirror face adjustment mechanism (both not shown in the drawings). The door mirror device 10 has a stay 18 screwed on a vehicular door panel, not shown in the drawings, to provide a retract mechanism 20 between the stay 18 and the door mirror body 12.

Figure 2:
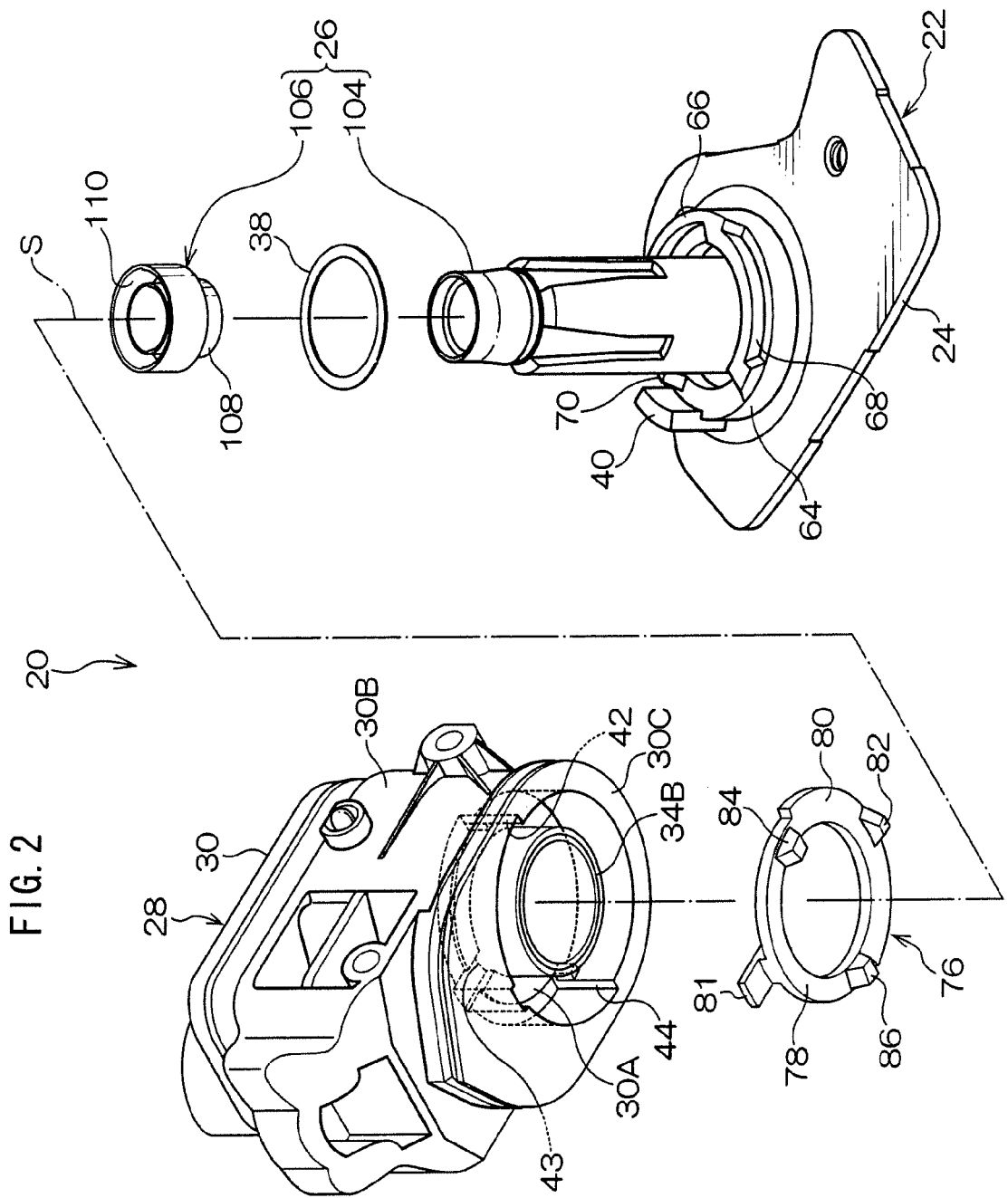
FIG. 2 is an exploded perspective view showing a structure of a housing mechanism shown in FIG. 1.
Figure 3:
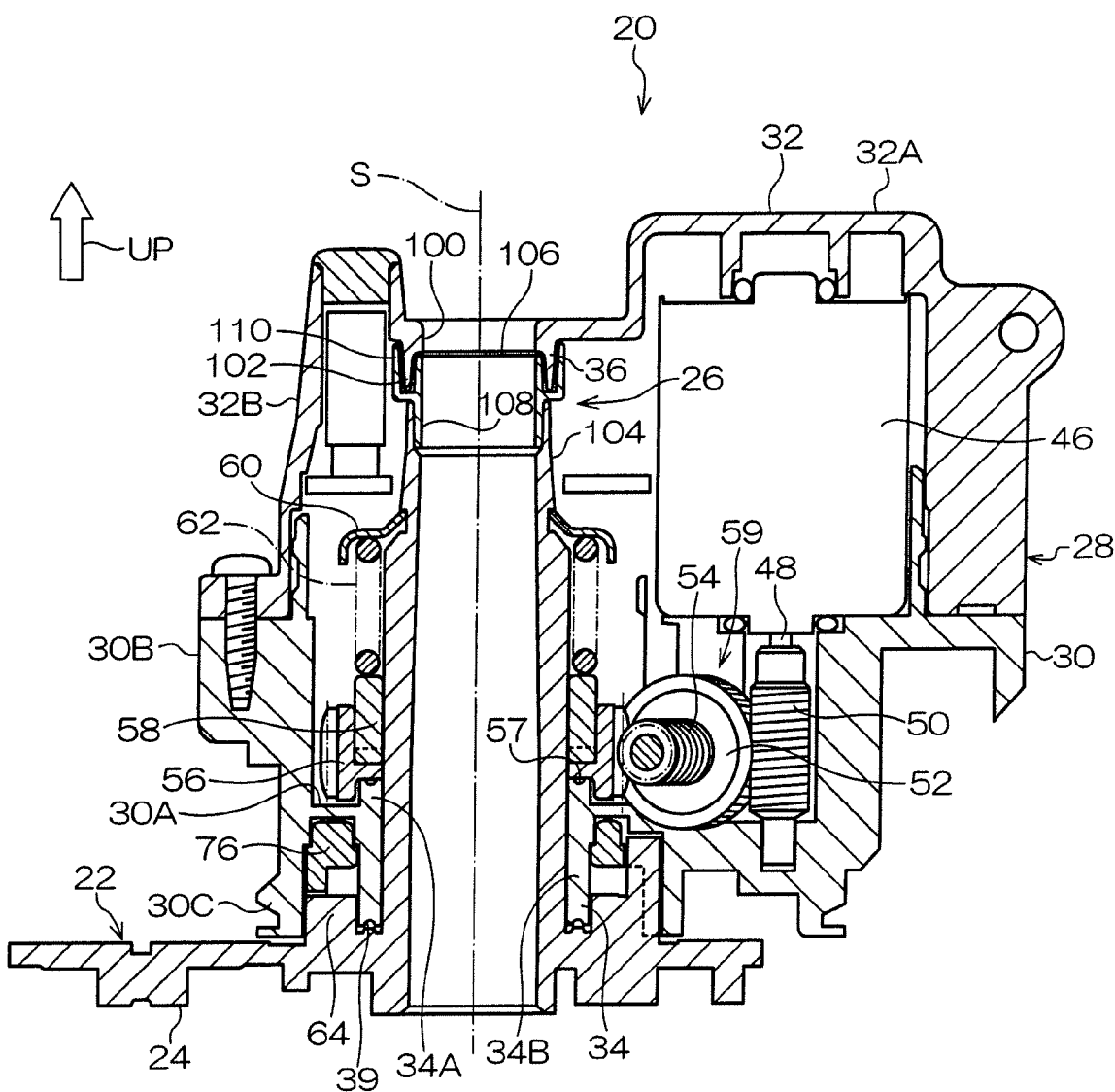
FIG. 3 is a sectional view axially taken, showing a structure of the housing mechanism shown in FIG. 1.

FIG. 2 shows an exploded perspective view of a construction of the retract mechanism 20 while FIG. 3 shows a sectional view of a construction of the retract mechanism 20. As shown in FIG. 2, the retract mechanism 20 has a mirror stand 22. The mirror stand 22 has base plate 24 to be fixed to the stay 18 (see FIG. 1) and a cylindrical the support shaft 26 provided upright on the upper surface of the base plate 24. Note that, in the figure, the character "S" is indicative of an axis of the support shaft 26, to describe the device from now on by taking the axis thereof in the direction of the axis "S".

As shown in FIG. 3, the retract mechanism 20 has a rotary case 28 in a housing form. The rotary case 28 is provided with a case body 30 in the underneath thereof while an upper cover 32 is removably mounted on the top surface side of the case body 30. The upper cover 32 is wholly formed in a housing form opened to the lower of the vehicle body. The upper cover 32 is integrally formed with a cylindrical sidewall 32B and a top plate 32A closing the top of a sidewall 32B.

Figure 4:
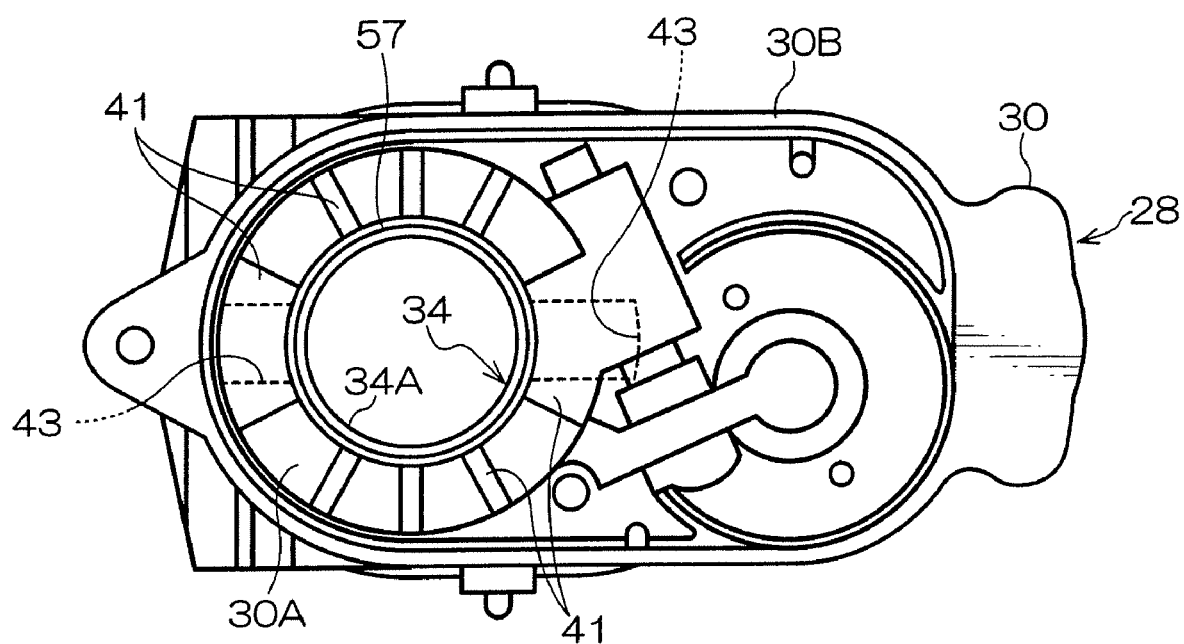
FIG. 4 is a bottom view of a rotary case shown in FIG. 1, as viewed from axially below.
Figure 5:
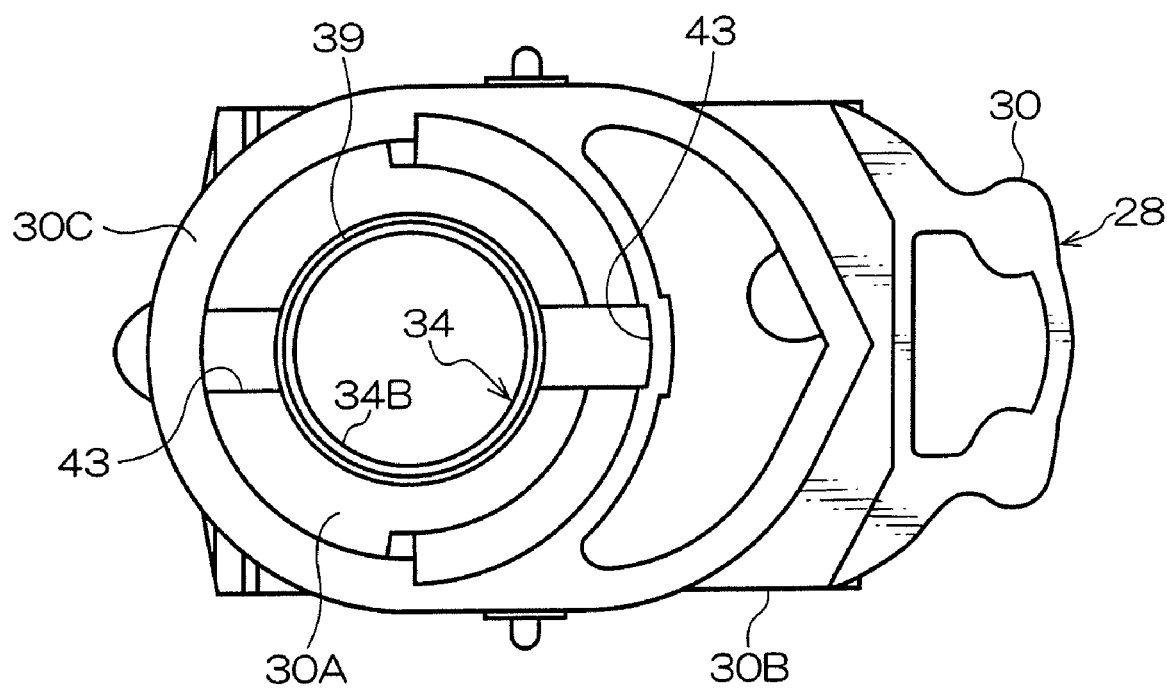
FIG. 5 is a plan view of the rotary case shown in FIG. 1, as viewed from axially above.

The case body 30 is formed in a housing form opened to the upper of the vehicle body. As shown in FIGS. 4 and 5, the case body 30 is integrally formed with the cylindrical sidewall 30B and the bottom plate 30A closing the lower side of the sidewall 30B. The cylindrical bearing 34 is formed in the bottom plate 30A of the case body 30, as shown in FIG. 3. The bearing 34 is integrally formed with the upward projection 34A that protrudes upwardly relatively to the bottom plate 30A and the lower projection 34B that protrudes downwardly relatively to the bottom plate 30A. The bearing 34 is rotatably fit by insertion over an outer periphery of the support shaft 26.

Figure 9:
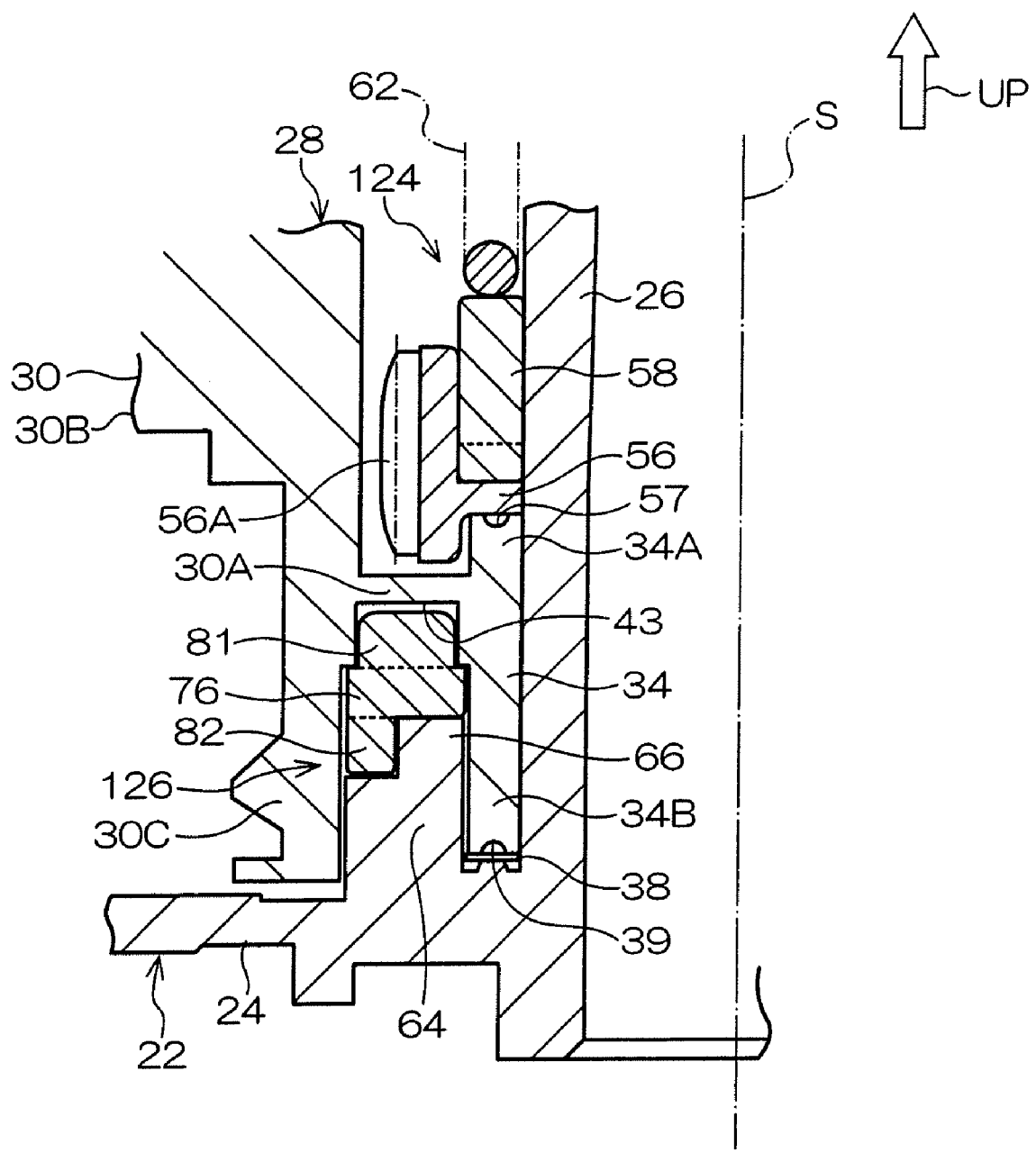
FIG. 9 is a sectional view, axially taken, showing a structure of the rotary case shown in FIG. 1 and the interior of the rotary case, showing the state first and second clutch mechanisms are in a non-operation state.

As shown in FIG. 2, an upright wall 64 is annularly formed on the base plate 24 of the mirror stand 22, coaxially to the outer periphery of the support shaft 26. A slip washer 38, formed in a ring-form, is arranged between the upright wall 64 and the outer peripheral surface of the support shaft 26. The case body 30 has a downward projection 34B placed in abutment at its tip surface against an upper surface of the base plate 24 through the slip washer 38, as shown in FIG. 9. This restricts the rotary case 28 from moving at its axially lower end relative to the support shaft 26. Meanwhile, the downward projection 34B has a tip surface in which a grease groove 39 is formed semicircular in section throughout the entire periphery. In the grease groove 39, grease is filled as a lubricant. Due to this, grease is supplied through the grease groove 39 to between the tip surface of the downward projection 34B and the slip washer 38.

As shown in FIG. 4, the bottom plate 30A of the case body 30 is integrally formed with plural ribs 41 radially extending from the upward projection 34A within the case body 30 so that the bearing 34 is reinforced by those ribs 41. As shown in FIG. 5, the bottom plate 30A of the case body 30 is formed with a pair of fit holes 43 at the outside of the case body 30. Fit holes 43, in one pair, are formed between a pair of adjacent ones of the ribs 41 (See FIG. 4). By a wall stretched between the one pair of the ribs 41, a bottom surface is formed for the fit holes 43. Two fit holes 43 are formed opposite with respect to the downward projection 34B and corresponding to a detent plate 76, referred later.

As shown in FIG. 3, the case body 30 is formed with a vertical wall 30C around the downward projection 34B. The vertical wall 30C is formed concentric to the downward projection 34B, correspondingly to an upright wall 64, referred later.

In the door mirror device 10, the rotary case 28 is coupled to the visor 14 through a frame, not shown in the drawings. The door mirror body 12 is rotatably supported in one body with the rotary case 28 by the support shaft 26. This allows the door mirror body 12 and the rotary case 28 to rotate, in the integral manner, between a retracted position shown in FIG. 6 and a mirror use position shown in FIG. 7, and, moreover, to rotate in the integral manner also to a forwardly inclinable position established frontward of the vehicle rather than the mirror use position.

When the rotary case 28 reaches the retracted position, a rotation prevention part 40 protruding on the base plate 24 of the mirror stand 22 shown in FIG. 2 abuts against a step 42 formed in an inner peripheral surface of the vertical wall 30C of the case body 30, thereby preventing the rotary case 28 from rotating. When the rotary case 28 reaches the forwardly inclinable position, the rotation prevention part 40 abuts against the step 44 formed in an inner peripheral surface of the vertical wall 30C, thereby preventing the rotary case 28 from rotating.

As shown in FIG. 3, the rotary case 28 accommodates therein a motor 46 as a torque generation source for rotating the rotary case 28 relative to the support shaft 26. The motor 46 is driven to rotate an output shaft 48 by operating a switch, not shown in the drawings, provided on the vehicle. When an external force acts against the rotation of the output shaft 48 and the supply current is increased to a value equal to or greater than a predetermined threshold, power feed is ceased by a control circuit, not shown in the drawings, provided on the vehicle.

A worm 50 is provided on an output shaft 48 of the motor 46. Worm 50 is in mesh with a helical gear 52. The helical gear 52 is coaxially fixed with a shaft worm 54 so that the helical gear 52 and the shaft worm 54 can rotate in the integral manner at all times.

Within the rotary case 28, a cylindrical the gear plate 56 is arranged on the outer periphery of the support shaft 26, as shown in FIG. 3. The gear plate 56 is structured as a driving clutch disk and rotatably fit by insertion over the outer periphery of the support shaft 26. The gear plate 56 is in slidable abutment, at its lower end in the inner periphery thereof, against the upper end surface of the upward projection 34A. In the upper end surface of the upward projection 34A, a grease groove 57 (see FIG. 9) semicircular in section is formed throughout the entire periphery thereof. The grease groove 57 is filled with grease serving as a lubricant. Due to this, the grease is supplied from the grease groove 57 to between the upper end of the upward projection 34A and the lower end of the gear plate 56.

As shown in FIG. 9, the gear plate 56 is formed with outer teeth 56A in an outer peripheral surface thereof so that the outer teeth 56A are in mesh with the shaft worm 54. In the door mirror device 10, as shown in FIG. 3, a gear train mechanism 59 is structured with the worm 50, the helical gear 52, the shaft worm 54 and the outer teeth 56A, thus allowing to transmit the torque generated by the motor 46 to the gear plate 56. Due to this, when the output shaft 48 is rotated by the drive force of the motor 46, the rotational torque about the support shaft 26 is transmitted to the gear plate 56 through the gear train mechanism 59. Here, the gear train mechanism 59 allows torque transmission only in one way from the output shaft 48 of the motor 46 to the support shaft 26.

Within the case body 30, a clutch disk 58 substantially cylindrical in form is axially arranged above the gear plate 56. The clutch disk 58 is structured as a driven clutch disk and fit by insertion on the outer periphery of the support shaft 26. The clutch disk 58 is fixed in the rotating direction about the support shaft 26 but allowed to move in the axial direction of the support shaft 26.

Figure 15:
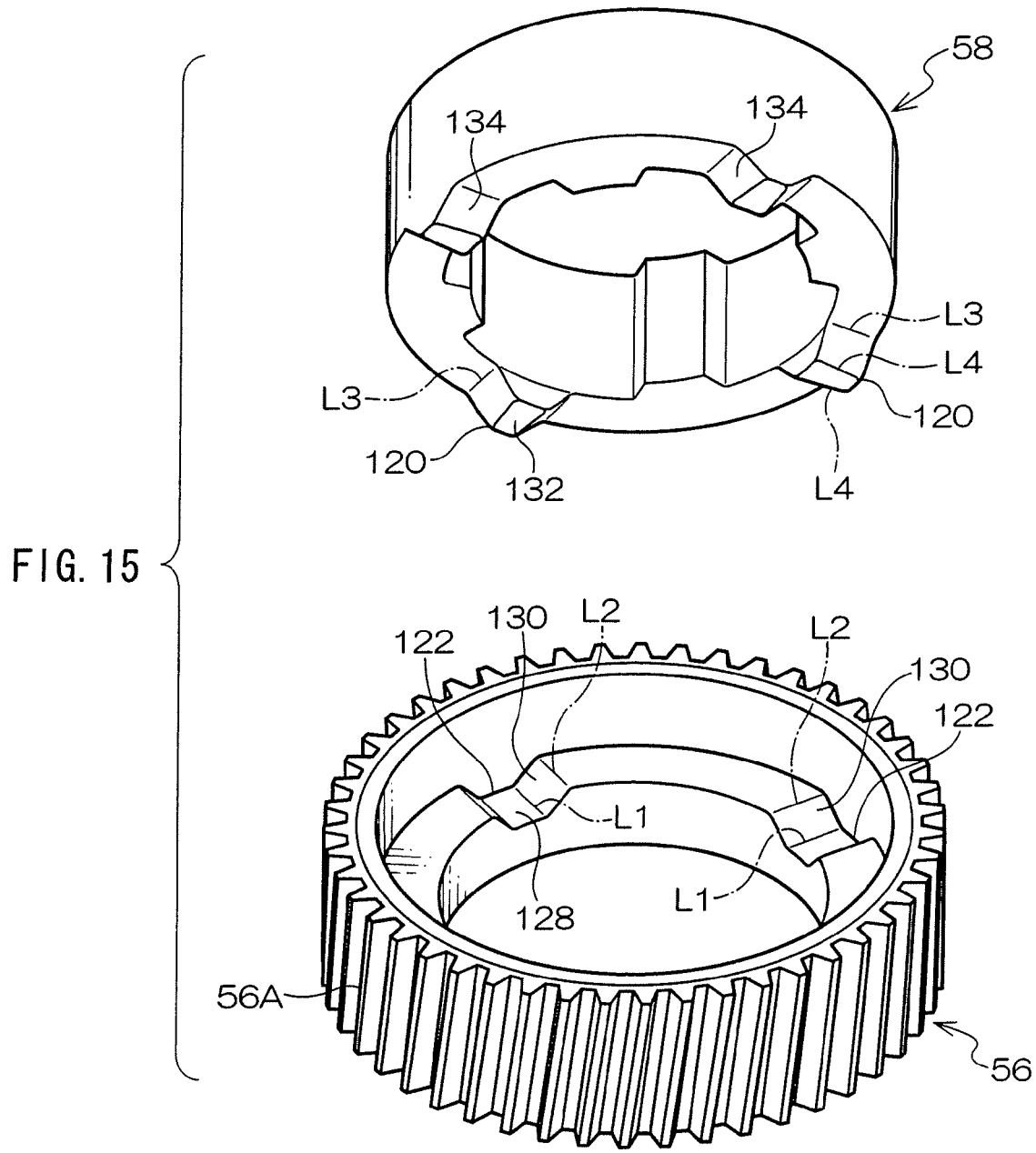
FIG. 15 is a perspective view showing a structure of a clutch disk and gear plate shown in FIG. 9.

As shown in FIG. 15, the clutch disk 58 is formed with plural (four in the exemplary embodiment) clutch projections 120 in the lower end surface thereof. The clutch projections 120 are arranged at an equal interval (at an interval of 90 degrees) circumferentially about the axis "S" thereof. Meanwhile, in the upper end surface of the gear plate 56, plural (four in the exemplary embodiment) clutch grooves 122 are formed in an inner periphery of outer teeth 56A correspondingly to the plural clutch projections 120. Those clutch grooves 122 are also arranged at an equal interval (at an interval of 90 degrees) circumferentially about the axis "S" thereof.

As shown in FIG. 3, a teeth washer 60, formed in a thin-walled ring form, is inserted and fixed in the above of the clutch disk 58, on the outer periphery of the support shaft 26. Between the teeth washer 60 and the clutch disk 58, a coil shaped clutch spring 62 is interposed in a compressed state. The clutch spring 62 axially biases, at all times, the clutch disk 58 at a given bias force toward the gear plate 56. Due to this, the clutch projections 120 of the clutch disk 58 usually (during non-operation of a first clutch assembly, referred later) is in a coupled state, i.e. inserted in clutch grooves 122 of the gear plate 56, wherein the gear plate 56 is fixed in the rotating direction about the support shaft 26 via the clutch disk 58, i.e. the gear plate 56 is prevented from relative rotating about the support shaft 26.

The clutch spring 62 has a bias force acting upon the bearing 34 of the rotary case 28 through the clutch disk 58 and the gear plate 56, to push the bearing 34 at its tip surface onto the base plate 24 of the mirror stand 22 through the slip washer 38.

Figure 10:
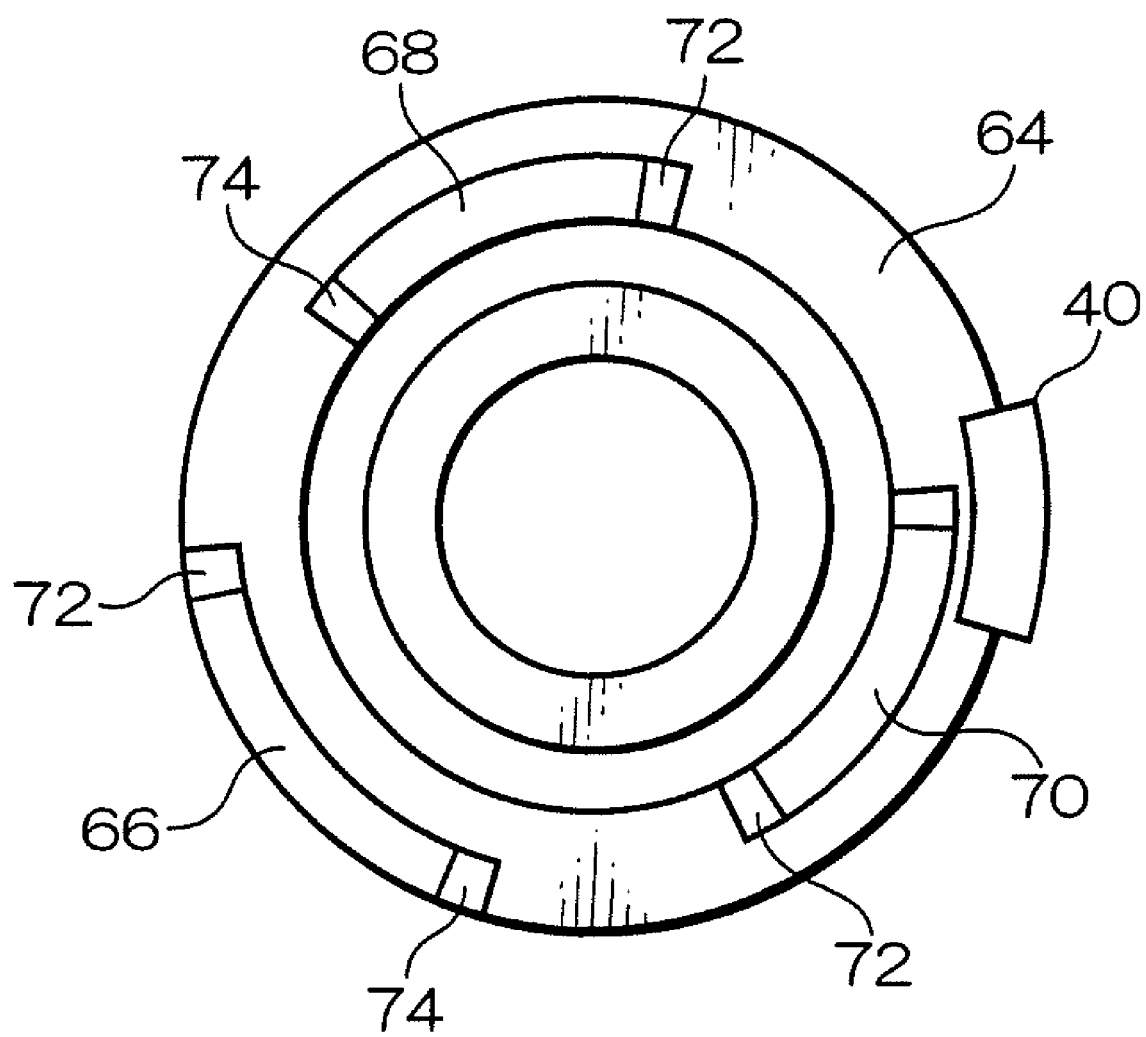
FIG. 10 is a plan view showing a structure of a upright wall of a mirror stand shown in FIG. 2.
Figure 11:
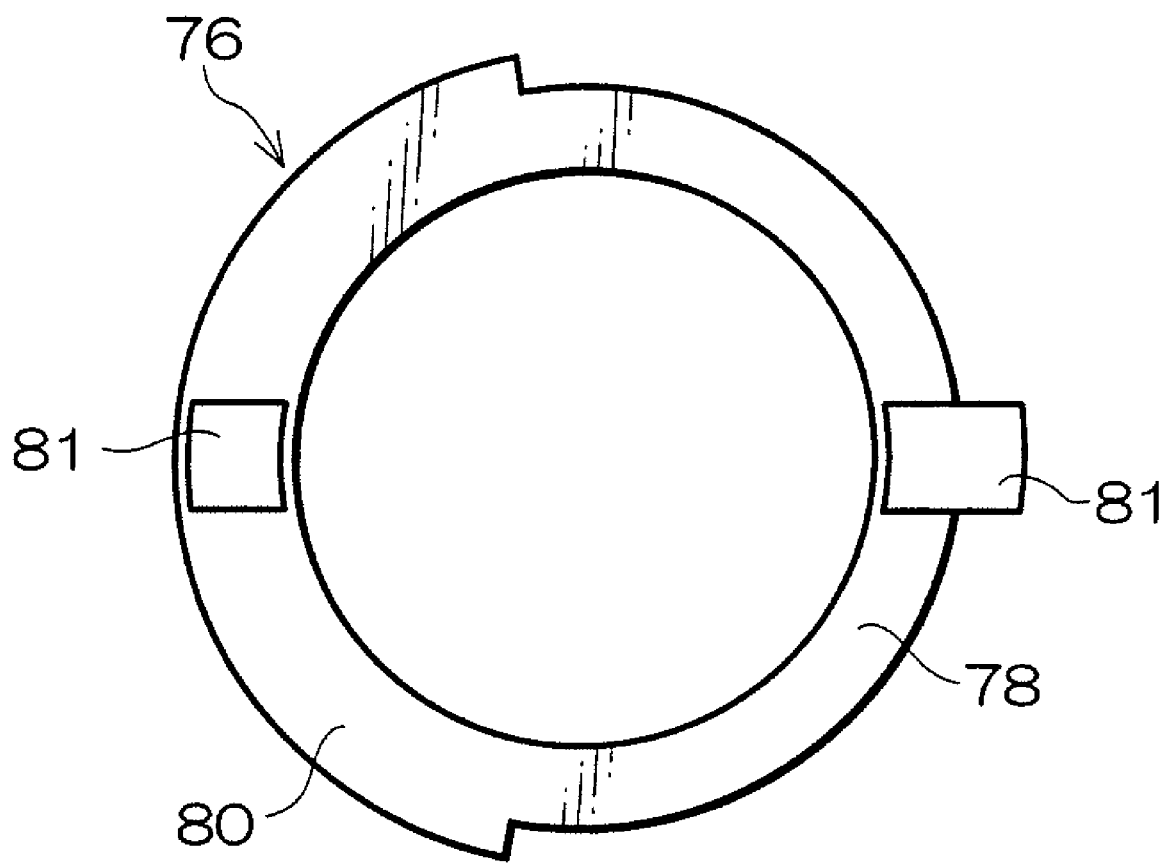
FIG. 11 is a plan view showing a structure of an upper end surface of a detent plate shown in FIG. 2.
Figure 12:
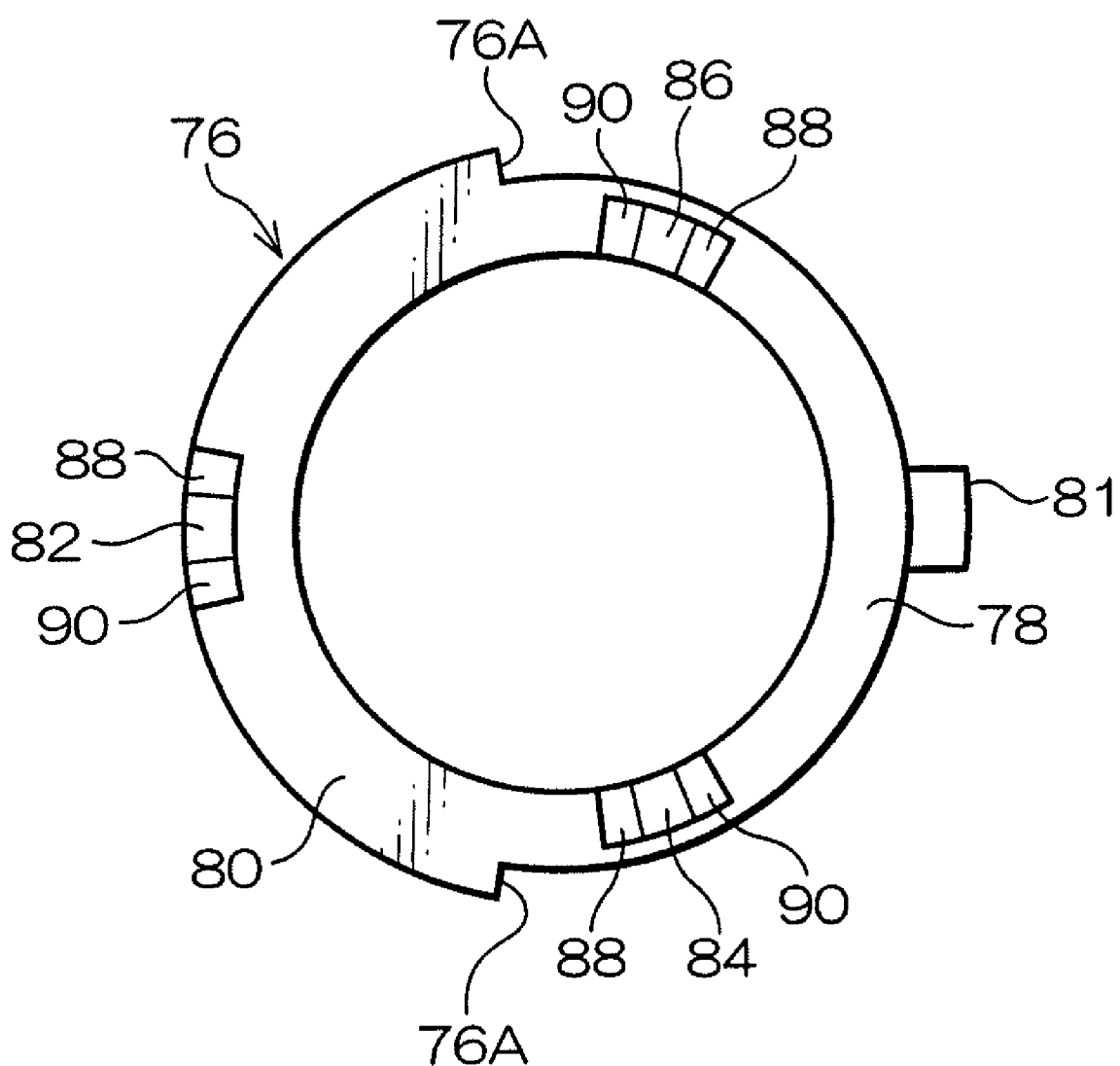
FIG. 12 is a plan view showing a structure of a lower end surface of the detent plate shown in FIG. 2.

Meanwhile, the upright wall 64, formed in the base plate 24 at an outer periphery of the support shaft 26, is inserted and received between the downward projection 34B and the vertical wall 30C of the case body 30. As shown in FIG. 2, three stand ridges 66, 68 and 70 protrude toward the rotary case 28, in the upper end surface of the upright wall 64 at an inner periphery thereof. As shown in FIG. 10, the three stand ridges 66, 67 and 70 are formed curving circumferentially about the axis "S", thus being provided substantially at an equal interval circumferentially. Stand ridges 66, 68 and 70 are each formed generally in a trapezoidal form having slant surfaces 72 and 74 at circumferential both ends. Here, one stand ridge 66 is arranged outer in periphery relative to the remaining two stand ridges 68 and 70. The two stand ridges 68 and 70 are equal in the distance (radial) from the axis S to each other.

As shown in FIG. 3, the detent plate 76, formed in a ring form, is arranged between the upright wall 64 of the mirror stand 22 and the bottom plate 30A of the case body 30. As shown in FIG. 1, two steps 76A are formed in an outer peripheral surface of the detent plate 76. In the detent plate 76, a narrow-width portion 78 is formed that is narrower in radial dimension in a region circumferentially extending nearly a half circumference, the region being bordered with two steps 76A and a broad-width portion 80 that is broader in radial dimension in the remaining region circumferentially extending nearly a half circumference.

In an end surface (upper end surface) of the rotary case 28A, a pair of fit projections 81 are formed respectively in the narrow width portion 78 and broad width portion 80. The fit projections 81 of the one pair are respectively fit and received in one pair of fit holes 43 (see FIG. 5) formed in the bottom plate 30A of the case body 30. This couples the detent plate 76 to the case body 30, thus the preventing the detent plate 76 from rotating relatively to the case body 30.

As shown in FIG. 2, the detent plate 76 has one case ridge 82 projecting toward the base plate 24 in a position close to the outer periphery in the lower end surface of the broad width portion 80, and two case ridges 84 and 86 projecting toward the base plate 24 in the lower end surface of the narrow width portion 78. These three case ridges 82, 84, 86 are arranged nearly at an equal interval circumferentially about the axis "S", each of which is formed in a trapezoid form having slant surfaces 88 and 90 respectively at circumferential both ends.

Figure 6:
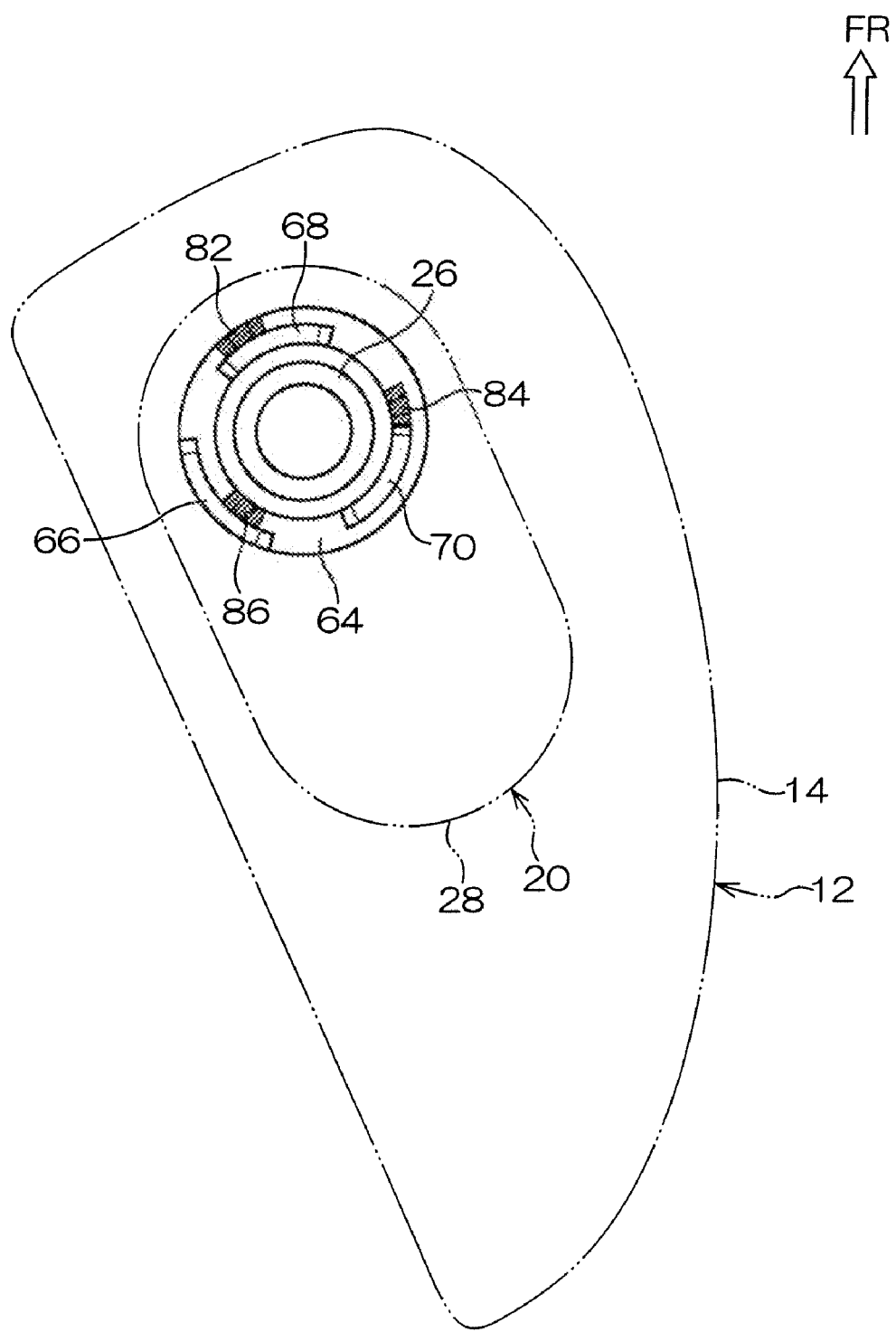
FIG. 6 is a plan views showing a structure of a door mirror body and rotary case shown in FIG. 1, showing the state the door mirror body and rotary case are in a retracted position.
Figure 7:
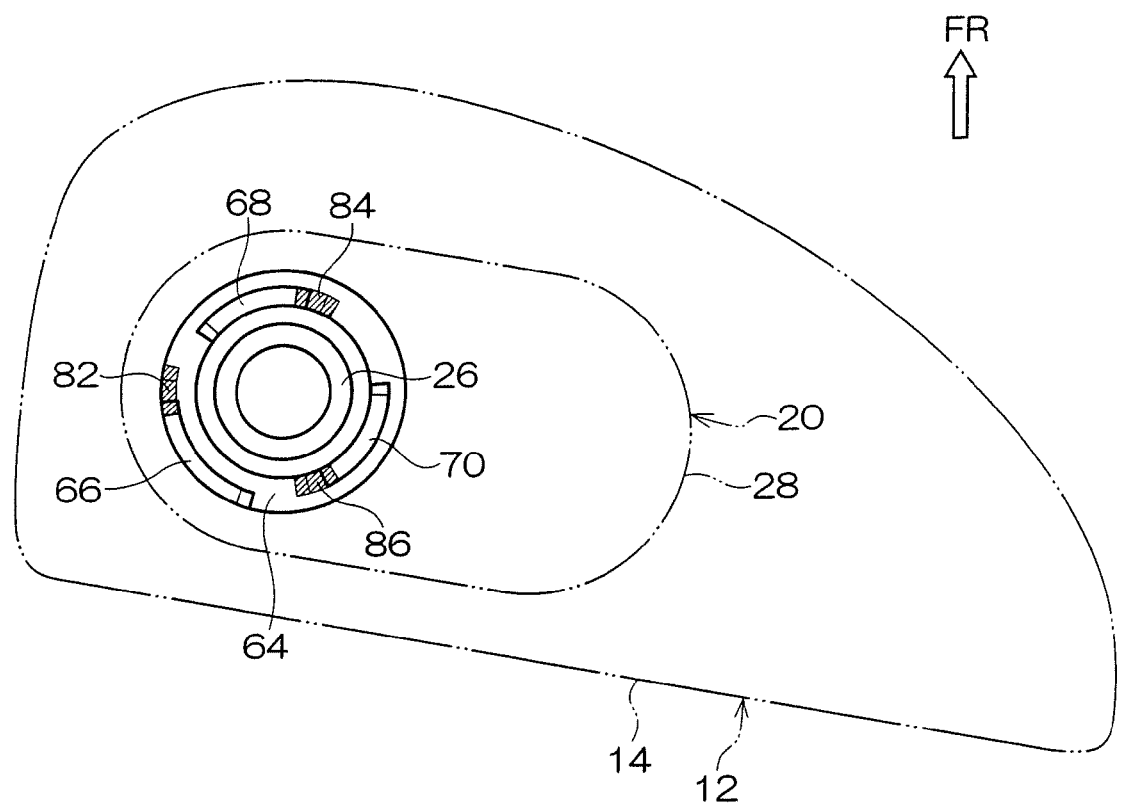
FIG. 7 is a plan views showing a structure of the door mirror body and rotary case shown in FIG. 1, showing the state the door mirror body and rotary case are in a mirror use position.
Figure 8:
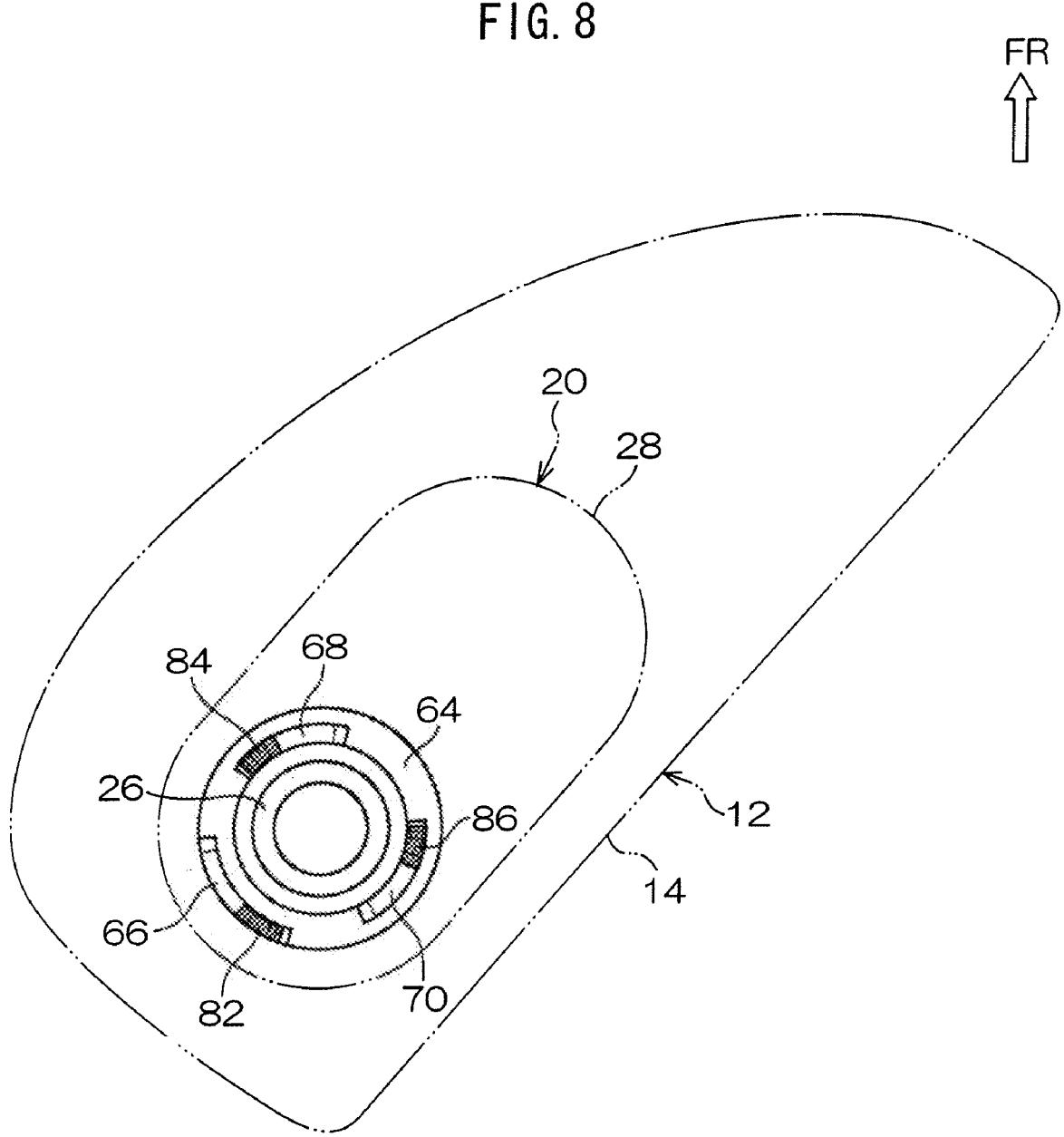
FIG. 8 is a plan views showing a structure of the door mirror body and rotary case shown in FIG. 1, showing the state the door mirror body and rotary case are in a forwardly inclinable position.

Here, the one case ridge 82 formed in the broad width portion 80 and the two case ridges 84 and 86 formed in the narrow width portion 78 are provided on different circles about the support shaft 26. As shown in FIGS. 6 and 7, these three case ridges 82, 84, 86 are respectively opposed to and circumferentially contactable with the stand ridges 66, 68, 70. The case ridges 82, 84, 86 and the stand ridges 66, 68, 70 are applied with grease.

As shown in FIG. 6, in the door mirror device 10, when the door mirror body 12 and the rotary case 28 are in the retracted position, three case ridges 82, 84, 86 of the detent plate 76 are circumferentially spaced from three stand ridges 66, 68, 70 of the upright wall 64. In the door mirror device 10, when the door mirror body 12 and the rotary case 28 are in a position between the retracted position and the mirror use position, as shown in FIG. 9, a slight gap is formed between the tip of vertical wall 30C of the case body 30 and the base plate 24 of the mirror stand 22.

As shown in FIG. 7, in the door mirror device 10, when the door mirror body 12 and the rotary case 28 are in the mirror use position, three case ridges 82, 84, 86 of the detent plate 76 respectively abut against the slant surfaces 72 of three stand ridges 66, 68, 70 of the upright wall 64. This restricts the rotatable case 28 from rotating beyond the mirror use position into the forwardly inclinable position.

In the door mirror device 10, a first clutch mechanism 124 (see FIG. 9) is structured by the clutch disk 58, the gear plate 56 and the clutch spring 62, to release the coupling state between the motor 46 and the support shaft 26 that are coupled through the gear train mechanism 59 when an excessive load acts, externally of the device, to the door mirror body 12 (the rotary case 28).

Figure 14:
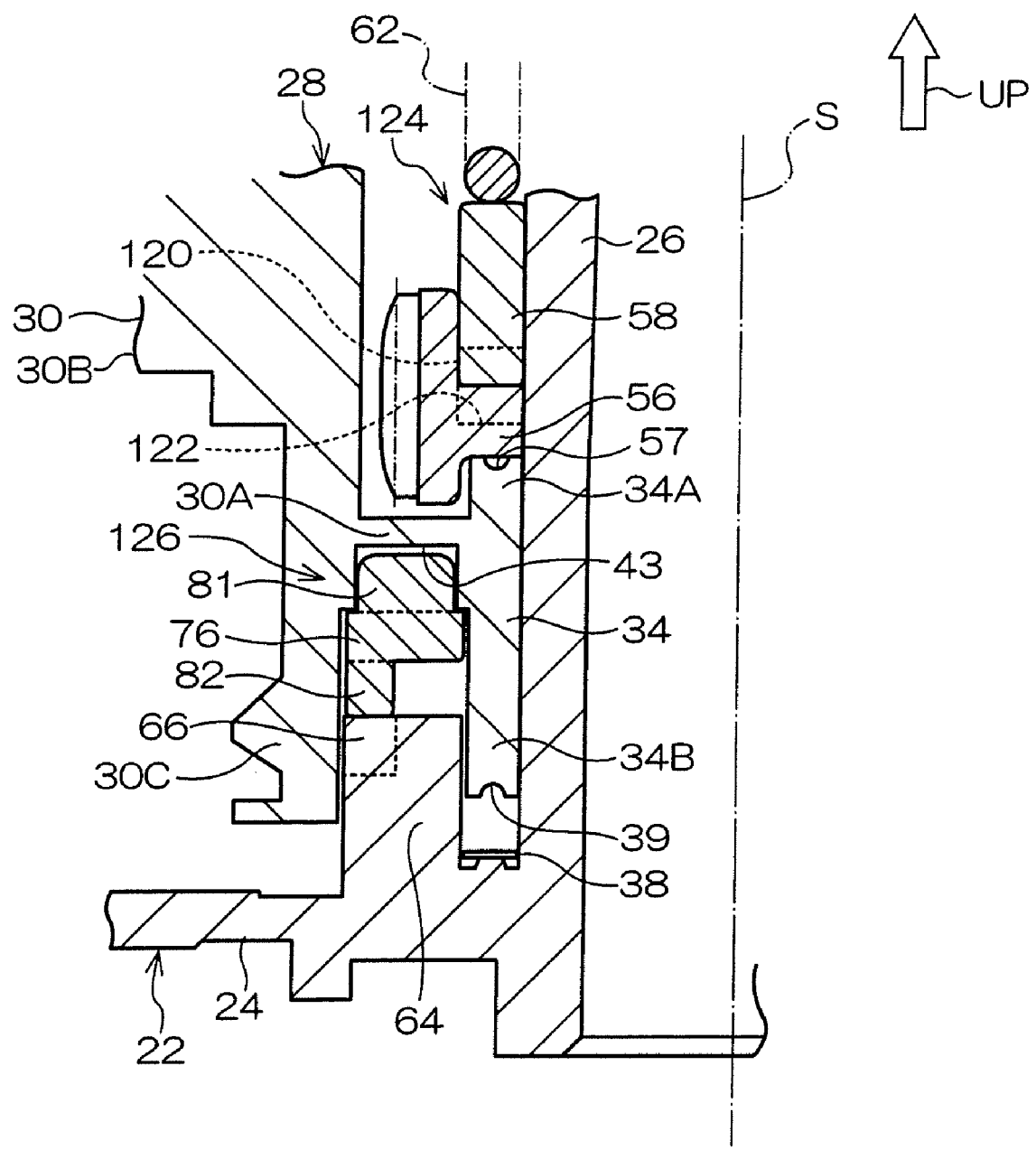
FIG. 14 is a sectional view, axially taken, showing a structure of the rotary case shown in FIG. 1 and the interior of the rotary case, showing the state the first and second clutch mechanisms are in an operation state.

In the door mirror device 10, when the first clutch mechanism 124 is not in operation, the clutch disk 58 receives the clutch projections 120 in the clutch grooves 122 of the gear plate 56, as shown in FIGS. 14 and 18A. Due to this, the gear plate 56 is coupled to the clutch disk 58 through the clutch projections 120 and the clutch grooves 122, and thus the clutch disk 58 prevents the gear plate 56 from rotating.

Meanwhile, in the door mirror device 10, when the first clutch mechanism 124 is not in operation, in case a load acts in a direction toward the mirror use position upon the door mirror body 12 (the rotary case 28) staying in the retracted position (see FIG. 6) or a load acts in a direction toward the retracted position upon the rotary case 28 staying in the mirror use position, the load is transmitted as a torque acting about the support shaft 26 to the gear plate 56 through the gear train mechanism 59.

Figure 13:
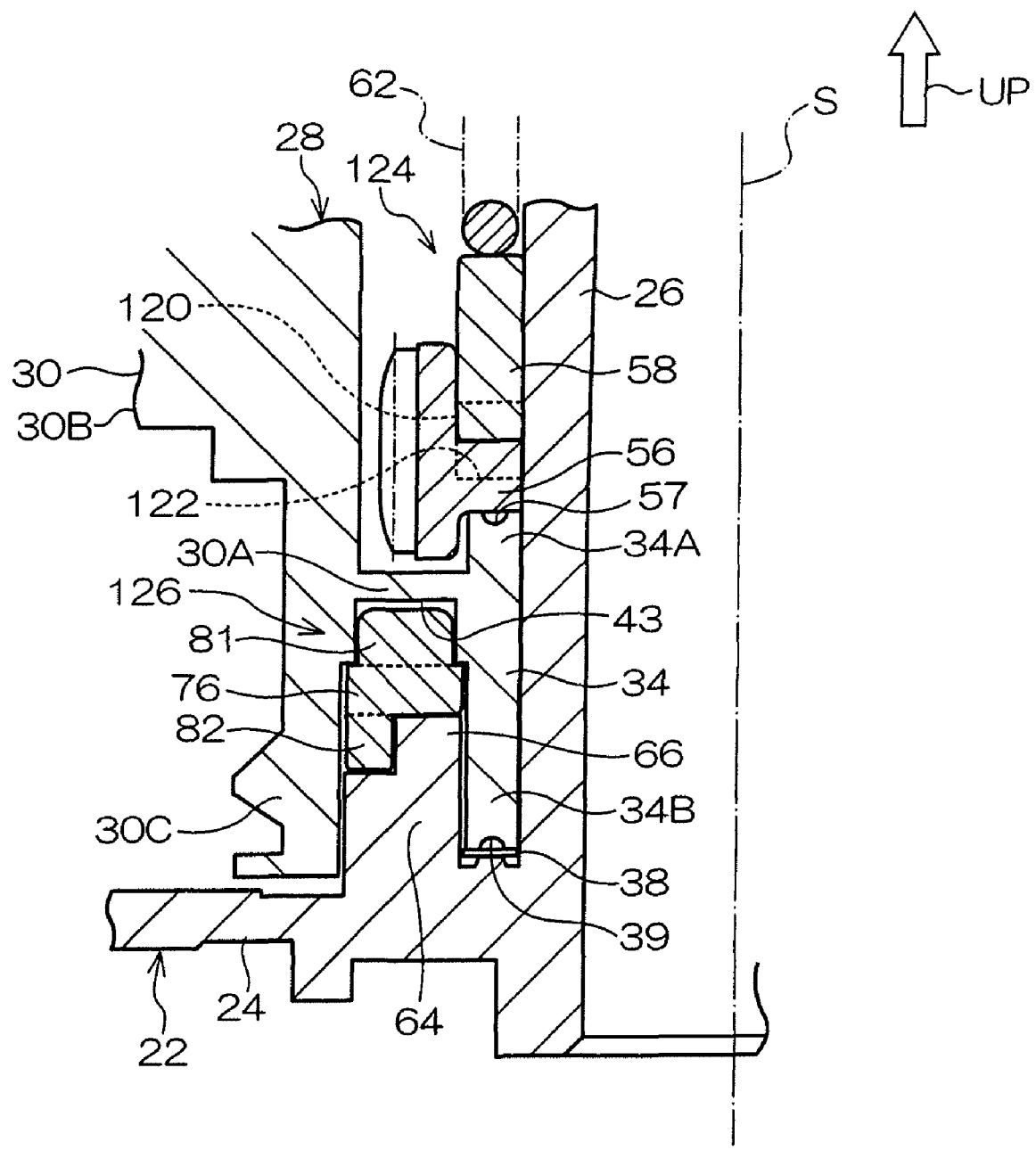
FIG. 13 is a sectional view, axially taken, showing a structure of the rotary case shown in FIG. 1 and the interior of the rotary case, showing the state the first clutch mechanism is in an operation state.

In this case, in a case in which the torque transmitted to the gear plate 56 is greater than a predetermined allowable value PL, as shown in FIG. 13, the clutch disk 58 moves upward while compressing the clutch spring 62, and causes the clutch projections 120 to move out of the clutch groove 122 of the gear plate 56, thus placing the clutch projections 120 in abutment against an upper end surface of the gear plate 56. This releases the coupling of the gear plate 56 and the clutch disk 58 and disengages the support shaft 26 from the motor 46 so that the rotary case 28 is allowed to rotate from the mirror use position into the retracted position or from the retracted position into the mirror use position.

In the door mirror device 10, a second clutch mechanism 126 is structured by the detent plate 76, upright wall 64 and the clutch spring 62. Namely, in the door mirror device 10, in a case in which a load acts toward the forwardly inclinable position upon the door mirror body 12 (the rotary case 28) staying in the mirror use position, the load is transmitted as a torque acting about the support shaft 26 upon the gear plate 56 through the gear train mechanism 59. In this case, when the torque transmitted to the gear plate 56 is greater than a predetermined allowable value PH, the first and the second clutch mechanisms 124 and 126 operate nearly simultaneously as shown in FIG. 14. The allowable value PH is established greater than the allowable value PL.

In the door mirror device 10, when the first clutch mechanism 124 operates, the clutch disk 58 moves upward and causes the clutch projections 120 to move out of the clutch groove 122 of the gear plate 56, as mentioned before. This releases the coupling of the gear plate 56 and the clutch disk 58, to disengage the support shaft 26 from the motor 46.

Meanwhile, in the door mirror device 10, when the second clutch mechanism 126 operates, the rotary case 28 rotates toward the forwardly inclinable position. Simultaneously, the case ridges 82, 84, 86 of the detent plate 76 at their slant surfaces 88 slide respectively with the slant surfaces 72 of the stand ridges 66, 68, 70 of the upright wall 64. Due to this, a component force, which is directed away from the upright wall 64, generates along axial direction on the detent plate 76.

Due to this, in the door mirror device 10, the detent plate 76 moves upward in the integral manner with the rotary case 28 against the bias force of the clutch spring 62 as shown in FIG. 14. The three case ridges 82, 84, 86 of the detent plate 76 respectively run aground the top surfaces of the three stand ridges 66, 68, 70 of the mirror stand 22. In this state, the rotary case 28 is allowed to rotate from the mirror use position up to the forwardly inclinable position.

Meanwhile, in the door mirror device 10, when the first clutch mechanism 124 is returned to the non-operation state after the first clutch mechanism 124 is operated, if the door mirror body 12 (the rotary case 28) is returned (rotated) to the position before the operation of the first clutch mechanisms 124, the clutch disk 58 is moved toward the gear plate 56 by the bias force of the clutch spring 62. Simultaneously, the clutch projections 120 of the clutch disk 58 are received in the clutch grooves 122 of the gear plate 56, thereby coupling (recoupling) the gear plate 56 to the clutch disk 58 in a manner to allowing transmit torque.

In the door mirror device 10, in a case in which the first and the second clutch mechanisms 124 and 126 are both returned to respective non-operation states after the first and the second clutch mechanisms 124 and 126 being operated, by returning (rotating) the door mirror body 12 (the rotary case 28) to the position before the operations of the first and the second clutch mechanisms 124 and 126, the first clutch 124 is returned to the non-operation state. Simultaneously, the detent plate 76 is moved downward in the integral manner with the rotary case 28 by the bias force of the clutch spring 62. The case ridges 82, 84, 86 of the detent plate 76 respectively move away from the top surfaces of the stand ridges 66, 68, 70 of the mirror stand 22 so that the case ridges 82, 84, 86 are circumferentially opposed to the stand ridges 66, 68, 70 of the mirror stand 22. This enables to transmit torque from the motor 46 to the support shaft 26 through the gear train mechanism 59 and restricts the rotation range of the rotary case 28 in a range which is between the mirror use position and the retracted position by means of the case ridges 82, 84, 86 and the stand ridges 66, 68, 70.

As shown in FIG. 3, an inner-walled cylinder 100 is formed in a downward protruding cylindrical form integral with the top plate 32A of the upper cover 32. The inner-walled cylinder 100 is arranged concentrically with the support shaft 26, whose one part at the tip side (the lower end) is supported in an axially superposed state with one part at the tip side (the upper end) of the support shaft 26. In the inner-walled cylinder 100 at the tip side, an immersion seal 102 is formed whose inner diameter becomes larger and whose wall thickness is decreasing with respect to the base end side. Meanwhile, the support shaft 26 has the cylindrical shaft body 104 integrally formed with the base plate 24 of the mirror stand 22 and a seal member 106 to be pressure-fixed to a tip end of the shaft body 104.

In the seal member 106, a pressure-fit cylinder 108 in a cylindrical form at the base end side. The seal member 106 is coaxially fixed at the tip of the shaft body 104 through the pressure-fit cylinder 108 by fitting the pressure-fit cylinder 108 by pressure in an inner periphery at the tip of the shaft body 104. In the seal member 106, a trough 110 made generally U shape in sectional form is integrally formed, at the tip end side with respect to the pressure-fit cylinder 108. The trough 110 is filled therein with grease (not shown in the drawings) as an infinite-form seal agent. In the inner-walled cylinder 100, the immersion seal 102 is inserted in the trough 110 wherein the immersion seal 102 is immersed at its tip end side in the grease. This provides a liquid-tight seal between the immersion seal 102 and the trough 110.

Now description is made in detail on the clutch projection 120 of the clutch disk 58 and the clutch groove 122 of the gear plate 56 that constitute the first clutch mechanism 124.

Figure 16:
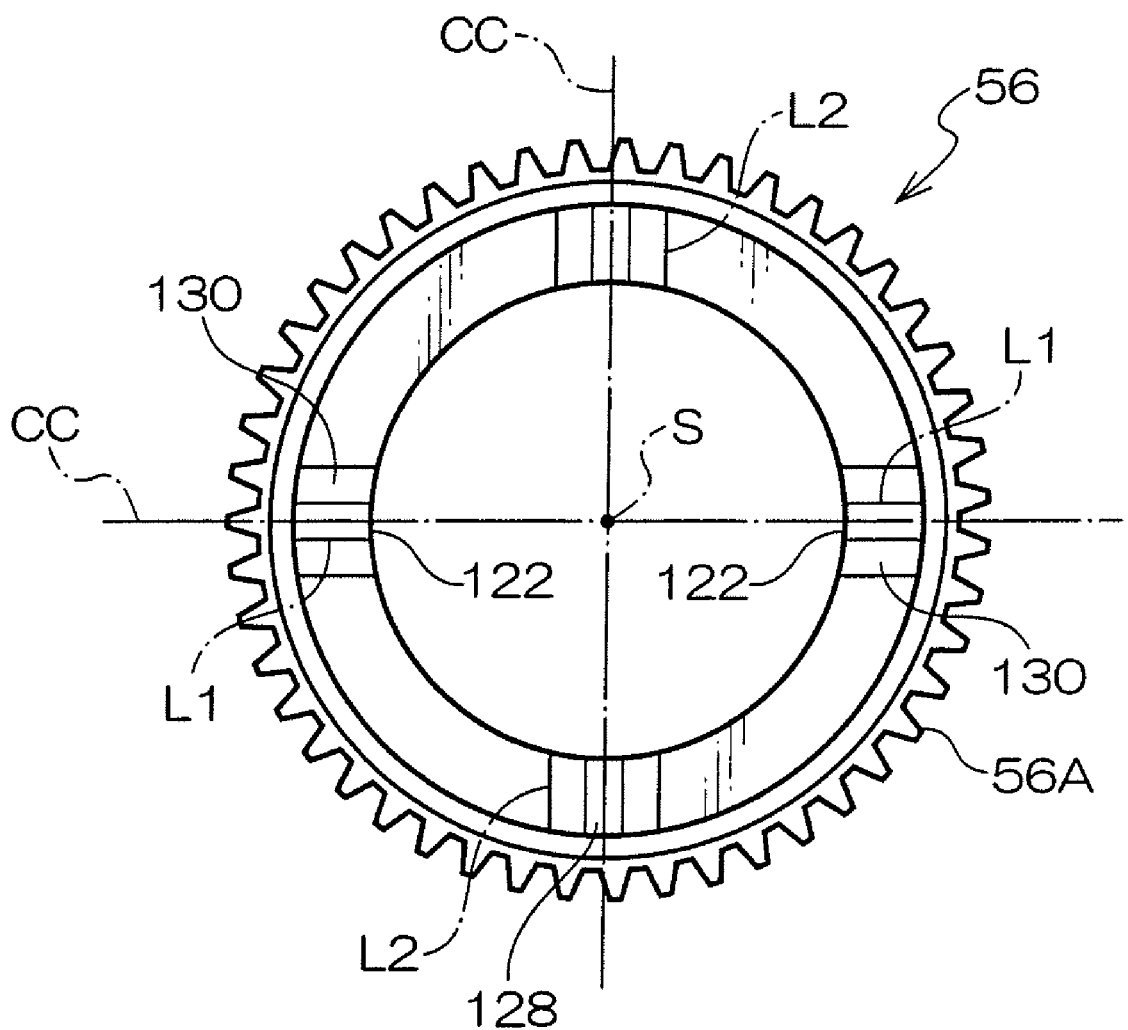
FIG. 16 is a plan view showing a structure of the gear plate shown in FIG. 15.

Four clutch grooves 122 of the gear plate 56 have respective centerlines CC whose extensions pass through the axis "S" and extend along radial directions whose center is the axis "S", as shown in FIG. 16. The clutch groove 122 is made nearly in a trapezoidal form increasing in width in a taper manner form from the bottom surface 128 toward the opening end thereof, in a section taken along the circumference whose center is the axis "S", as shown in FIG. 18D. The clutch groove 122 has first edge lines L1 at which a bottom surface 128 at its both ends and a pair of side surfaces are intersecting and second edge lines L2 at which a pair of side surfaces 130 and the upper end surface of the gear plate 56 are intersecting, the first edge lines L1 and the second edge lines L2 extend parallel with the centerline CC, respectively, as shown in FIG. 16.

Figure 17:
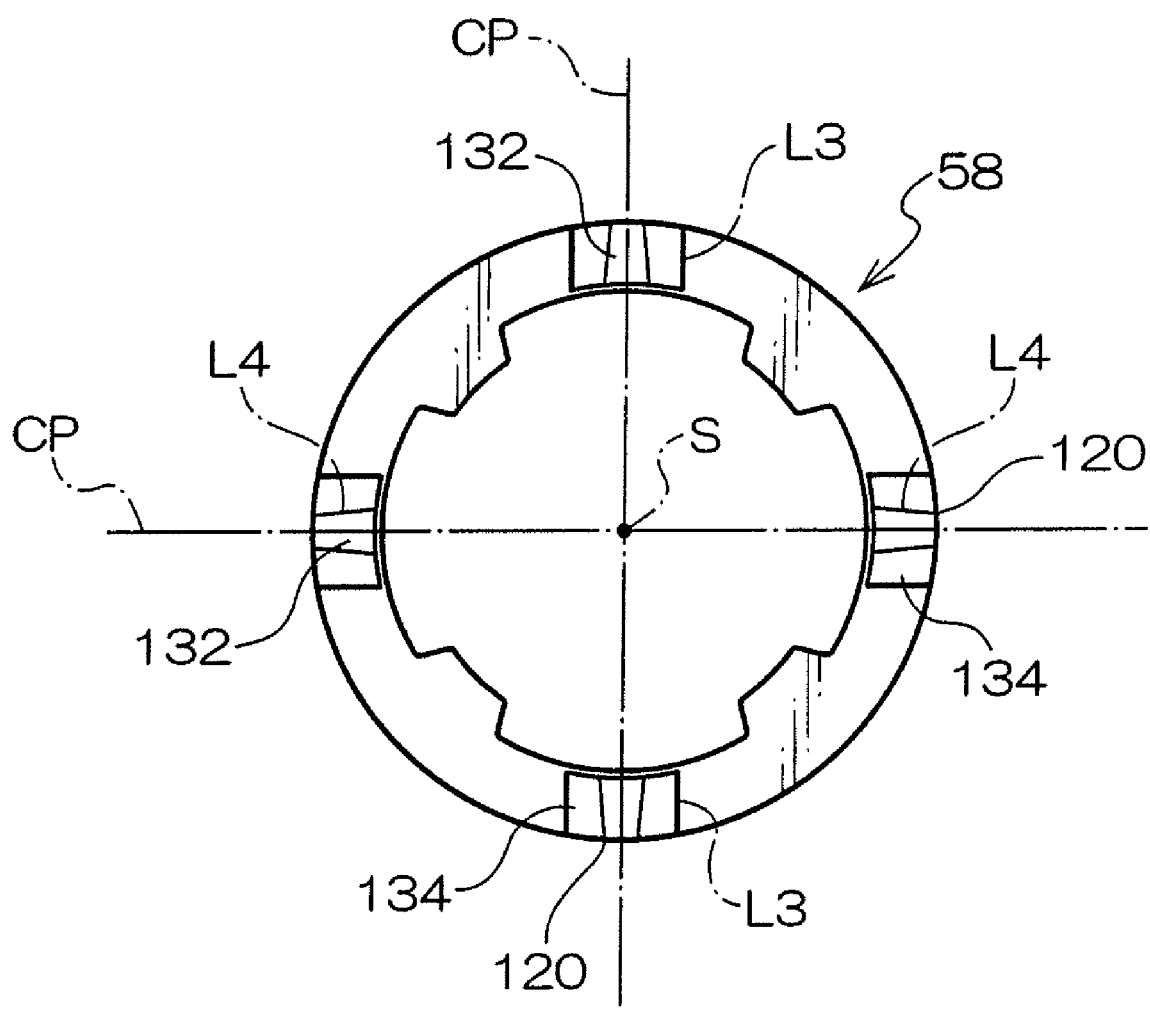
FIG. 17 is a plan view showing a structure of the clutch disk shown in FIG. 15.

Meanwhile, the clutch projections 120 of the clutch disk 58 have respective centerlines CP whose extensions pass through the axis "S" and extend along the radial directions whose center is the axis "S", as shown in FIG. 17. The clutch projection 120 is formed made nearly in a trapezoidal form decreasing in width in a taper manner from a base portion toward a top surface 132, in a section taken along the circumference whose center is the axis "S", as shown in FIG. 18D. The clutch projection 120 has third edge lines L3 at which a pair of side surfaces 134 intersect with the upper end surface of the gear plate 56, as shown in FIG. 17.

Meanwhile, the clutch projection 120 has fourth edge lines L4 at which at both end lines of the top surface 132 intersect with a pair of side surfaces 134, and which extend in inclining manner toward the centerline CP from the inner periphery side to the outer periphery. Fourth edge lines L4 in one pair are equal in the inclination angle with respect to the centerline CP to each other. Namely, the top surface 132 of the clutch projection 120 is formed so-called in an inverted radial shape (a curved trapezoidal form) having a surface form whose width is decreasing in a taper manner form from the inner periphery side (axis "S" side) to the outer periphery side. That is, the pair of fourth edge lines L4 at which the top surface 132 of the clutch projection 120 and the side surfaces 134 positioned at both sides of the top surface 132 intersect are inclined with respect to a line CP extending from the axis "S" in the radial direction such that the outer peripheral side of the fourth edge line L4 is nearer than the inner peripheral side (axis "S" side) of the fourth edge line L4 to the line CP.

Function of the Exemplary Embodiment

Now description is made on the operation and function of the door mirror device 10 according to the present exemplary embodiment.

In the door mirror device 10, when the motor 46 is driven by operating a switch, not shown in the drawings, and the worm 50 is rotated in the integral manner with the output shaft 48, the helical 52 gear meshed with the worm 50 is rotated in the integral manner with the shaft worm 54, thereby transmitting a rotation force to the gear plate 56 which the shaft worm is in mesh with. The reaction force of the rotation force rotates the rotary case 28. This rotates the door mirror body 12 in the integral manner with the rotary case 28 from the mirror use position into the retracted position or from the retracted position into the mirror use position.

When the door mirror body 12 and the rotary case 28, rotating from the retracted position into the mirror use position, reaches the mirror use position, the respective slant surfaces 88 of the three case ridges 82, 84, 86 of the detent plate 76 are in abutment against the slant surfaces 72 of the three stand ridges 66, 68, 70 of the mirror stand 22. This restricts the door mirror body 12 and the rotary case 28 from rotating toward the front of the vehicle beyond the mirror use position. Due to this, the output shaft 48 of the motor 46 is not allowed to rotate, thus raising the current flowing to the motor 46 to a predetermined threshold value or higher. Due to this, the current supply to the motor 46 is shut off by a control circuit, not shown in the drawings.

Meanwhile, when a load acts toward the rear of the vehicle (toward the retracted position) upon the door mirror 12 (the rotary case 28) staying in the mirror use position, or a load acts toward the front of the vehicle (toward the mirror use position) upon the rotary case 28 staying in the retracted position, in a magnitude exceeding the allowable value PL, the clutch disk 58 moves upward against the bias force of clutch spring 62. By disengaging the clutch projections 120 out of the clutch grooves 122 of the gear plate 56, the coupling of the motor 46 and the support shaft 26 through the train mechanism 59 is released, allowing the rotary case 28 to rotate from the mirror use position to the retracted position.

Meanwhile, when a load acts toward the front of the vehicle (the forwardly inclinable position) upon the rotary case 28 staying in the mirror use position in a magnitude exceeding the allowable value LH, the clutch disk 58 moves upward against the bias force of clutch spring 62. Simultaneously, the clutch projections 120 are moved out of the clutch groove 122 of the gear plate 56, and the detent plate 76 is moved upward against the bias force of clutch spring 62. By moving three case ridges 82, 84, 86 respectively to the top surfaces of three stand ridges 66, 68, 70 of the mirror stand 22, the rotary case 28 is allowed to rotate from the mirror use position to the forwardly inclinable position.

In the door mirror device 10 explained so far, the clutch grooves 122 of the gear plate 56 are each made, circumferentially sectionally, nearly in the substantially trapezoidal form increasing in width in a taper form from the bottom surface 128 toward the opening end thereof. Moreover, the clutch projections 120 of the clutch disk 58 are each made, circumferentially sectionally, nearly in the substantially trapezoidal form decreasing in width in a taper form from the base portion toward the top surface 132, whose top surface 132 is made in an inverted radial form decreasing in width from the inner periphery side to the outer periphery side. Due to this, when a torque equal to or smaller than the allowable value PL is transmitted from the rotary case 28 or the motor 46 to the gear plate 56 as a driving clutch disk, the clutch projection 120 is kept in a state received in the clutch groove 122 as shown in FIG. 18A. In this case, while one side surface 134 of the clutch projection 120 is contacted under pressure with one side surface 130 of the clutch groove 122, a press-contact force (load) acting from the side surface 134 of the clutch projection 120 to the side surface 130 of the clutch groove is transmitted as a torque about the axis "S" to the driven clutch disk 58. By the reaction force of the torque, the rotary case 28 is rotated following the gear plate 56.

Here, FIG. 18E shows the clutch projection 120 as viewed in plane wherein a dotted pattern DB illustrates a contact area (a pressure-contact area) of the clutch projection 120 with the clutch groove 122 in the state the clutch projection 120 stays as shown in FIG. 18A. As apparent from this figure, a portion of the side surface 134 of the clutch projection 120 whose portion is at the inner periphery side is placed in pressure contact with a portion of the side surface 130 of the clutch groove 122 whose portion is at the inner periphery side, in a state approximate to point contact.

In the door mirror device 10, when a torque exceeding the allowable value PL is transmitted from the motor 46 or the rotary case 28 to the gear plate 56, the component force along the axial direction which is caused between the side surface 134 of the clutch projection 120 which is slanted relative to the axial direction and the side surface 130 of the clutch groove 122 which is slanted relative to the axial direction, is greater than the bias force of clutch spring 62. While the clutch disk 58 gradually moves upward against the bias force of clutch spring 62, the clutch projection 120 gradually moves out of the clutch groove 122 according to the rotation of the gear plate 56 as shown in FIGS. 18A-18D. When the gear plate 56 rotates a predetermined amount, the clutch projection 120 moves out of the clutch groove 122 and run aground the upper surface of the gear plate 56.

Here, FIGS. 18E-18H each show the clutch projection 120 as viewed in plan, wherein the dotted pattern DB and dotted patterns DW illustrate a contact area (a pressure-contact area) of the clutch projection 120 with the clutch groove 122 in the state the clutch projection 120 stays as shown in FIGS. 18A-18D, respectively. The dotted pattern DB shown in FIGS. 18E-18H represents the actual pressure-contact area of the clutch projection 120 in the state in which the clutch projection 120 is as shown in FIGS. 18A-18D. The dot patterns DW represent a movement path (a locus) of the pressure-contact area on side surface 134 when the clutch projection 120 moves from the state as shown in FIG. 18A to the state as shown in FIG. 18D.

As shown in FIG. 18F, in the initial stage of rotation of the gear plate 56, the pressure-contact area (the dotted pattern DB) moves in the substantially circumferential direction on the side surface 134 from a point which is near the end of the side surface 134 at the third edge line L3 side toward a point which is at the fourth edge line L4 side. Then, as shown in FIGS. 18G and 18H, the pressure-contact area moves in the substantially radial direction on the side surface 134 from the inner periphery side to the outer periphery side as the rotation amount of the gear plate 56 increases.

Immediately before disengagement of the clutch projection 120 out of the clutch groove 122, the pressure-contact area moves slightly toward the fourth edge line L4 side according to the rotation of the gear plate 56 as shown in FIG. 18(H).

Therefore, according to the door mirror device 10, when a torque exceeding the allowable value PL is transmitted to the gear plate 56, the clutch projections 120 move out of the clutch grooves 122 as the gear plate 56 rotates (changes in phase) wherein the pressure-contact area between the clutch projection 120 and the clutch groove 122 gradually moves from the inner periphery side to the outer periphery side. As compared to the conventional door mirror device in which "edge lines of a clutch projection and edge lines of a clutch groove are provided parallel with a radial direction, a pressure-contact area between a clutch-projection side surface and a clutch groove side surface is staying at the outer periphery side such that the pressure-contact area is almost no changing", the occurrence of sticking phenomenon immediately after a start of device assembling can be effectively prevented. The sticking phenomenon is that firm fixing takes places between the side surface 134 of the clutch projection 120 and the side surface 130 of the clutch groove 122. As a result, it is possible to suppress from excessively increasing, relative to the set value (=allowable value PL), the operation torque for disengaging the clutch projections 120 of the clutch disk 58 out of the clutch grooves 122 of the gear plate 56 due to the occurrence of sticking phenomenon.

In the door mirror device 10, the clutch projection 120 at its top surface is made in a form of the inverted radial shape which decreases in width from the inner periphery side to the outer periphery side. Moreover, in the clutch projection 120, the third edge line L3 at which the lower end surface of the clutch disk 58 and the side surface 134 intersect is parallel with the radial direction. Due to those, during torque transmission to the gear plate 56, a component force F is caused in a predetermined direction at the side surface 134 of the clutch projection 120 and the side surface 130 of the clutch groove 122. As shown in FIG. 18A, the component force F has a starting point in the pressure-contact area which is in the initial stage, thus being directed from the inner periphery to the outer periphery and inclined toward the centerline CP. Due to those, the component force initially occurring at the side surfaces 130 and 134 is in a direction approximate to the direction of movement of the pressure-contact area. Therefore, when a torque exceeding the allowable value PL is transmitted to the gear plate 56, the pressure contact area between the side surface 134 of the clutch projection 120 and the side surface 130 of the clutch groove 134 can be gradually moved (slid) smoothly from the inner periphery to the outer periphery with smoothness as the rotation amount of the gear plate 56 increases.

Incidentally, in the door mirror device 10 according to the present exemplary embodiment, the clutch projections 120 are formed in the clutch disk 58 which is the driven side while the clutch grooves 122 are formed in the gear plate 56 serving as the clutch disk. Even where the clutch projections are formed in the gear plate 56 and the clutch grooves 122 are formed in the gear plate 56 conversely to the above, operation/effect is available similarly to that of the door mirror device 10 according to the present exemplary embodiment.

Examples

Figure 19:
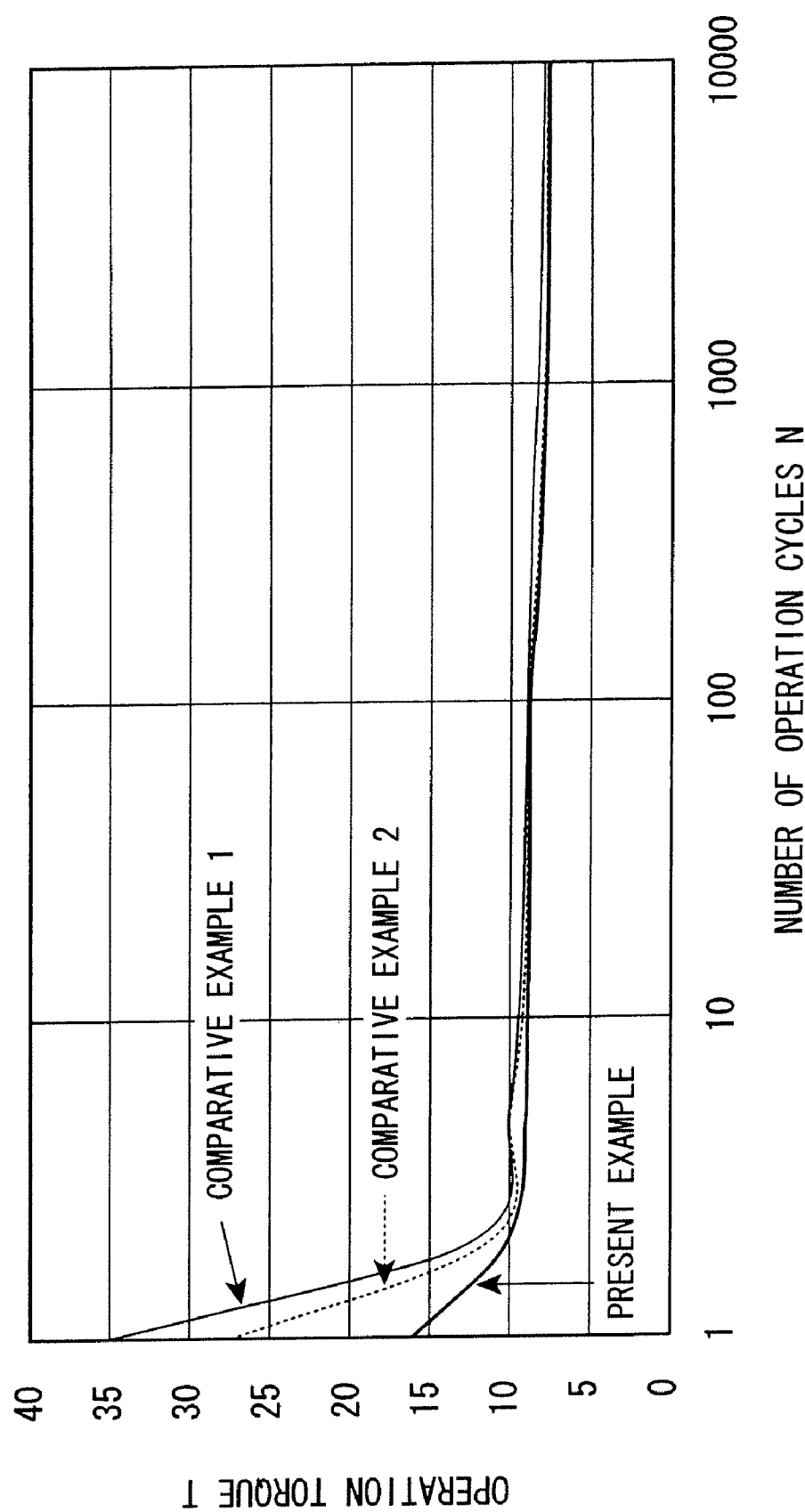
FIG. 19 is a graph showing a relationship between an operation torque and a number of operation cycles of the first clutch mechanism in the door mirror device according to an example of the invention and comparative examples.

FIG. 19 shows a relationship between an operation torque and a number of operation cycles of the first clutch assembly in the door mirror devices according to an example of the invention and comparative examples. In the door mirror device according to the present example, the clutch projections and the clutch grooves according to the foregoing present embodiment (see FIGS. 15, 16 and 17) are formed respectively in the clutch disk and the gear plate that constitute the first clutch assembly.

Meanwhile, in the door mirror device according to comparative example 1, clutch projections and clutch grooves of a clutch disk and a gear plate are in parallel with the radial direction whose center is the axis "S" and, moreover, edge lines L1-L4 (those edge lines have a meaning similarly to that in the foregoing embodiment) are parallel with the centerline of the clutch projections and clutch grooves of the clutch disk and the gear plate.

In the door mirror device according to comparative example 2, its clutch disk and gear plate are made in so-called a radial form whose edge lines L1-L4 have respective extension lines passing through the axis "S". Incidentally, the present example and the comparative examples 1 and 2 use respective clutch springs having equal spring constant and compression amount.

As shown in FIG. 19, in all of the present example and the comparative examples 1 and 2, the operation torque T is maximal at the number of operation cycles N of "1" wherein the operation torque T decreases rapidly in "1"-"3" operation cycles as the number of operation cycles N increases. The operation torque T is nearly constant and stabilized at the number of operation cycles N of "4" and over.

In the door mirror device according to the present exemplary embodiment, the operation torque T is sufficiently small at the number of operation cycles N of "1" to "3", as compared to that of the door mirror devices according to the comparative examples 1 and 2. Particularly, when the operation torque T which is transmitted when operating of the first clutch assembly is 25 or over, it is in a risky region in which the initial defect (sticking between the clutch projections and the clutch) is occurred easily. However, in the door mirror device according to the present exemplary embodiment, the operation torque T is suppressed sufficiently low at the initial operation of the first clutch assembly.

What is claimed is:

1. A vehicular mirror device comprising:
   a mirror stand on which a support shaft is provided and which is coupled to a vehicle body;
   a rotary case that is disposed on an outer periphery of the support shaft such that the rotary case is supported rotatably by the support shaft, and that is coupled with a rearview mirror;
   a driven clutch disk of annular shape, that is fitted by insertion to the outer periphery of the support shaft such that the driven clutch disk is fixed to the support shaft along a rotation direction whose center is the support shaft, and is supported movably in an axial direction of the support shaft;
   a driving clutch disk of annular shape, that is fitted by insertion to the outer periphery of the support shaft such that the driving clutch disk is supported relatively rotatably by the support shaft, and is coupled to the rotary case along the rotation direction;
   a clutch biasing member that biases in the axial direction the driven clutch disk toward the driving clutch disk;
   a clutch groove that is formed on one of one end surface of the driven clutch disk or another end surface of the driving clutch disk, the clutch groove being formed so as to extend along a radial direction whose center is an axis center of the support shaft; and
   a clutch projection that is formed on the other of the one end surface of the driven clutch disk or the another end surface of the driving clutch disk, the clutch projection being formed so as to extend along the radial direction, in which when torque is transmitted from the rotary case to the driving clutch disk in a value which is equal to or smaller than a set value corresponding to a bias force of the biasing member, the clutch projection is received in the clutch groove to be in a coupling state in which the driving clutch disk is coupled to the driven clutch disk so as to allow transmission of torque, and when torque is transmitted from the rotary case to the driving clutch disk in a value which exceeds the set value, the clutch projection is moved out from the clutch groove to release the coupling state;
   wherein the clutch groove is formed substantially in a trapezoidal shape in a cross section along a circumferential direction whose center is the axis center of the support shaft, in which a width of the clutch groove increases from a groove bottom surface toward a groove opening end, and
   the clutch projection is formed substantially in a trapezoidal shape in the cross section along the circumferential direction, in which a width of the clutch projection decreases from a projection base end toward a projection tip end, and a top surface of the clutch projection is formed in an inverted radial shape in which a width of the top surface decreases from an inner periphery side toward an outer periphery side.

2. The vehicular mirror device of claim 1, further comprising:
- a torque generation source that is disposed in the rotary case, and
- a torque transmission mechanism that is disposed in the rotary case, the torque transmission mechanism coupling the torque generation source to the driving clutch disk so as to allow transmission of torque such that a torque generated by the torque generation source is transmitted to the driving clutch disk as a driving torque in the rotation direction whose center is the support shaft.

3. The vehicular mirror device of claim 1, wherein
a first edge line at which the groove bottom surface and a groove side surface intersect in the clutch groove, and a second edge line at which the side surface intersects with the one of the one end surface of the driven clutch disk or the another end surface of the driving clutch disk are provided extending parallel with the radial direction respectively, and
a third edge line, at which a side surface of the clutch projection intersects with the other of the one end surface of the driven clutch disk or the another end surface of the driving clutch disk, is provided extending parallel with the radial direction.

4. The vehicular mirror device of claim 2, wherein
a first edge line at which the groove bottom surface and a groove side surface intersect in the clutch groove, and a second edge line at which the side surface intersects with the one of the one end surface of the driven clutch disk or the another end surface of the driving clutch disk are provided extending parallel with the radial direction respectively, and
a third edge line, at which a side surface of the clutch projection intersects with the other of the one end surface of the driven clutch disk or the another end surface of the driving clutch disk, is provided extending parallel with the radial direction.

5. The vehicular mirror device of claim 1, wherein a plurality of clutch grooves are formed on the one of the one end surface of the driven clutch disk or the another end surface of the driving clutch disk along a circumference direction whose center is the axis center of the support shaft, and a plurality of clutch projections are formed on the other of the one end surface of the driven clutch disk or the another end surface of the driving clutch disk along the circumference direction.

6. The vehicular mirror device of claim 1, wherein the clutch groove is formed on the another end surface of the driving clutch disk, and the clutch projection is formed on the one end surface of the driven clutch disk.

7. The vehicular mirror device of claim 1, wherein the clutch projection is formed on the another end surface of the driving clutch disk, and the clutch groove is formed on the one end surface of the driven clutch disk.

8. The vehicular mirror device of claim 3, wherein a pair of fourth edge lines at which the top surface of the clutch projection and the side surfaces positioned at both sides of the top surface intersect are inclined with respect to a line extending from the axis center in the radial direction such that an outer peripheral side of the fourth edge line is nearer than an inner peripheral side of the fourth edge line to the line extending from the axis center in the radial direction.

9. The vehicular mirror device of claim 4, wherein a pair of fourth edge lines at which the top surface of the clutch projection and the side surfaces positioned at both sides of the top surface intersect are inclined with respect to a line extending from the axis center in the radial direction such that an outer peripheral side of the fourth edge line is nearer than an inner peripheral side of the fourth edge line to the line extending from the axis center in the radial direction.

* * * * *